(12) United States Patent
Nakamura

(10) Patent No.: US 6,350,337 B1
(45) Date of Patent: Feb. 26, 2002

(54) METHOD OF MANUFACTURING STRUCTURE BY USING BIODEGRADABLE MOLD

(75) Inventor: Tetsuya Nakamura, Ohtawara (JP)

(73) Assignee: Sakura Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/190,388

(22) Filed: Nov. 12, 1998

(30) Foreign Application Priority Data

| Nov. 12, 1997 | (JP) | ............................................. 9-310480 |
| Nov. 19, 1997 | (JP) | ............................................. 9-318243 |
| Feb. 2, 1998 | (JP) | ............................................ 10-020943 |

(51) Int. Cl.⁷ .......................... B29C 33/40; B29C 33/52; B29C 70/30
(52) U.S. Cl. ........................ 156/155; 156/221; 264/221; 264/257; 264/258; 264/312; 249/61; 425/176; 425/DIG. 12
(58) Field of Search ................................ 264/221, 257, 264/317, 258; 249/61, 175; 425/176, DIG. 12; 156/155, 221

(56) References Cited

U.S. PATENT DOCUMENTS

| 4,590,026 A | * | 5/1986 | Goto ............................. 264/221 |
| 4,695,484 A | * | 9/1987 | Tanaka et al. ................. 427/245 |
| 5,462,983 A | * | 10/1995 | Bloembergen et al. ........ 524/51 |
| 5,605,943 A | * | 2/1997 | Solomon ....................... 523/139 |
| 5,688,586 A | * | 11/1997 | Shiiki et al. .................. 428/221 |
| 5,756,714 A | * | 5/1998 | Antrim et al. ................ 536/102 |
| 5,759,569 A | * | 6/1998 | Hird et al. .................... 424/443 |
| 5,985,197 A | * | 11/1999 | Nelson et al. ................ 264/221 |

FOREIGN PATENT DOCUMENTS

| DE | 1807193 | 11/1968 | ............. B22C/9/10 |
| DE | 3900206 | 7/1990 | ............. B29C/33/76 |
| EP | 0466419 | 1/1992 | ............. B22D/29/00 |
| GB | 2225742 | 6/1990 | ............. B29C/67/14 |
| GB | 2294709 | 5/1996 | ............. B29C/70/22 |
| JP | 61162331 | 7/1986 | ............. B29D/31/00 |
| JP | 05345836 | 12/1993 | ............. C08J/11/00 |
| JP | 7284902 | 10/1995 | ............. B22D/17/22 |
| WO | 9813183 | 4/1998 | ............. B29C/33/52 |

OTHER PUBLICATIONS

Eiji Ikada, Enhancement of Degradation Rate of Plastics for Suppression of Environmental Pollution by Plastics Waste, Dec. 1997.

* cited by examiner

*Primary Examiner*—Jan H. Silbaugh
*Assistant Examiner*—Stefan Staicovici
(74) *Attorney, Agent, or Firm*—Volpe and Koenig, P.C.

(57) ABSTRACT

A core is made of a biodegradable material, reinforcing fibers and non-hardened resin are laminated on the core so as to form a fiber-reinforced composite material. Then, the fiber-reinforced composite material is hardened, and then biochemically active substances, such as microorganisms and enzymes, are brought into contact with the core so that the core is biochemically degraded and removed.

2 Claims, 14 Drawing Sheets

(b)

METHOD OF MANUFACTURING STRUCTURE BY USING BIODEGRADABLE MOLD

BACKGROUND OF THE INVENTION

The present invention relates to a method of manufacturing a composite-material product, such as a container, a tubular product, a wing or another structure, reinforced by, for example, reinforcing fibers. More particularly, the present invention relates to a method of manufacturing a structure made of fiber-reinforced plastic or the like by using a mold, for example, a core, the removal of which from the structure has been difficult and which is made of a biodegradable material.

When a composite-material product reinforced by carbon-fiber-reinforced plastic (hereinafter called "CFRP") or glass-fiber-reinforced plastic (hereinafter called "GFRP"), for example, a hollow structure having an undercut, is manufactured, a method structured as shown in FIG. 30 has been employed.

That is, a metal and split mandrel 401 composed of a shell 401a and a core 401b having shapes corresponding to a shape attempted to be molded is prepared. Then, CFRP or GFRP is laminated on the outer surface of the shell 401a of the split mandrel 401 so that a reinforcing-fiber-reinforced resin layer 402 is formed. The reinforcing-fiber-reinforced resin layer 402 is hardened with heat or at room temperatures. Then, the shell 401a and core 401b of the split mandrel 401 are mechanically decomposed (separated) so as to be removed from the inside portion of the reinforcing-fiber-reinforced resin layer 402. As a result, a hollow structure 403 is molded.

If the shape of the hollow structure attempted to be molded by the metal and split mandrel is too complicated to easily be removed by mechanical decomposition after the molding process has been completed, the following method is employed. That is, the mandrel is made of a metal material having a low melting point. Moreover, the CFRP or GFRP is laminated on the outer surface of the mandrel as described above to form the fiber-reinforced resin layer. Then, the fiber-reinforced resin layer is hardened at room temperatures, and then the mandrel is heated at appropriate temperatures so as to be melted and removed.

Another method is known with which the mandrel is made of a material which can be melted with a chemical. Another method is known with which the mandrel is made of collapsible plaster which is crushed so as to be removed after the molding process has been completed. The above-mentioned manufacturing methods have been employed to mold a product, such as a duct 404 including a warped portion 404a and a branch portion 404b, as shown in FIG. 31(a). Also the foregoing methods have been employed to mold, for example, a tubular member 405 having bent portions 405a at two ends thereof, as shown in FIG. 31(b).

However, the split mandrel cannot easily be manufactured and thus the manufacturing cost is enlarged. If a complicated shape is attempted to be formed, the separation and removal which are performed after the molding process has been completed cannot easily be performed as well as the difficulty in manufacturing the same. In this case, excessively large force is added to the molded product and, therefore, the molded product is deformed or broken.

Any one of the above-mentioned method of removing the mandrel by heating and melting the same, the method of removing the mandrel by melting the same by using a chemical and the method of removing the mandrel by crushing the collapsible plaster require a large number of steps. Thus, all of the foregoing methods suffer from unsatisfactory productivity. When a molded product having a complicated shape is attempted to be manufactured, the mandrel cannot completely be removed. When the core is manufactured by aluminum, the solvent of the chemical is sodium hydroxide. However, a great cost is required to perform disposal of sodium hydroxide after the core has been dissolved. What is worse, environmental pollution is undesirably caused to take place.

In recent years, weight reduction and increase in the strength have been required. Therefore, prepreg has energetically been developed which contains thermosetting resin, such as epoxy resin or unsaturated polyester, serving as a matrix thereof and a reinforcing material, such as carbon fibers, aramide fibers or glass fibers, added thereto. Therefore, the needs for a variety of products containing the prepreg have considerably been grown. In addition, the needs for a composite-material product such that thermoplastic resin, such as nylon or polyether-ether ketone (PEEK), is used as the matrix have been grown.

Since the prepreg of the foregoing type is a material having excellent characteristics which enable light weight and strong structure to be manufactured, it can be considered that a composite material is an advantageous material to make various elements for use in an extreme condition in, for example, an aerospace industrial field. Since the foregoing structures usually have complicated shapes, complicated processes are required to manufacture the foregoing structures.

When the thermosetting resin or the thermoplastic resin is employed as the matrix of the core of the honeycomb for use in the composite-material structure and long carbon-fiber-reinforced plastic (hereinafter called "CFRP") or the glass-fiber-reinforced plastic (hereinafter called "GFRP") is employed as the reinforcing fiber, the prepreg must be laminated in a trapezoidal mold having asperities so as to be hardened by an autoclave or a pressing machine.

A fact is known that a structure that the long fiber CFRP or GFRP employed as the reinforcing fiber of the core material enables a strong and rigid honeycomb plate to be manufactured. However, there arises a problem in that long time and great effort are required to inject the material and to perform a laminating process when a waveform plate is molded to manufacture the core member. Further, since the honeycomb structure such as the honeycomb plate has normally a directional property, etc., it has been difficult to design and manufacture the three-dimensional honeycomb structure. However, the honeycomb plate suffers from unsatisfactory strength against a load added in a direction perpendicular to the longitudinal plate.

When an airplane or a wing structure such as wings or fan's blades are manufactured by using the known honeycomb structures, the main body of the wing 411 is constituted by honeycomb cores 412 having lower densities, that is, a large cell size (the length of one side of a hexagon is long), as shown in FIG. 32. In this case, the weight of the wing 411 can be reduced. If the outer surface of the wing 411 is attempted to be smoothed or if the resistance against collision with an object is attempted to be somewhat enlarged, it is preferable that honeycomb cores 413 each having a high density, that is, a small cell size (the length of one side of a hexagon is short) is employed.

Therefore, a two-layer structure has been employed which is composed of the honeycomb cores 412 having the large cell size and the honeycomb cores 413 having the small cell size which are laminated through the prepreg 414. However, the manufacturing process requires long time and great effort and a complicated three-dimensional curved surface cannot easily be manufactured. Therefore, the above-mentioned structure cannot practically be employed. Although the honeycomb can be preformed at high temperatures, a large heat-resisting mold is required to preform the honeycomb. Thus, the manufacturing cost is enlarged.

When a three-dimensional curved surface is manufactured by using the honeycomb, a core material 415 must be cut to form a rectangular block into the three-dimensional curved surface, as shown in FIG. 33(a). As an alternative to this, a honeycomb core material 416 for forming a three-dimensional curved surface must be employed, as shown in FIG. 33(b). In either case, the manufacturing cost cannot be reduced. Therefore, another requirement is imposed to manufacture a complicated structure of the foregoing type by using the composite material at a low cost.

BRIEF SUMMARY OF THE INVENTION

To achieve the above-mentioned objects, a first characteristic of the present invention lies in that a core or another mold for molding a required structure is made of a biodegradable material, followed by manufacturing the structure by using the mold and followed by biochemically decomposing the mold.

The biodegradable material for use to make the above-mentioned mold is a polymer which can be degraded with microorganisms, enzymes or another biochemical means or a mixed material of the polymer and a biodegradable material. Each of the above-mentioned material is biochemically degraded into e.g., water and carbon dioxide after the structure has been molded. Therefore, the material can easily and completely be removed from the structure. Since the biodegradable material can be degraded into the harmless substances, the disposal cost can be reduced and a problem of environmental pollution does not arise.

The present invention has another characteristic for efficiently degrading the mold, such as the core, made of the biodegradable material. For example, a structure manufactured by using the above-mentioned mold is accommodated in a degrading tank. In the foregoing tank, a solution containing biochemically active substances, such as microorganisms, enzymes or the like, is circulated. The solution is added with substances for enhancing the action of the biochemically active substances, for example, nutrients for the microorganisms. The temperature, pH, components and so forth of the solution which is circulated in the degrading tank are adjusted. Moreover, substances, for example, metabolites of the microorganisms, for example, carbon dioxide, which deteriorate the action of the biochemically active substances are removed from the degrading tank.

The mold made of the above-mentioned biodegradable material has a structure which enhances the biochemical degradation. If the mold is employed as the core, the core is formed into a hollow shape to maintain a passage and surface of contact with the solution containing the biochemically active substances. The mold is made of open-cell foam composed of the biodegradable material to enhance passage of the solution containing the biochemically active substances. Moreover, the area of contact can be enlarged.

The above-mentioned mold is made of a composite material composed of biodegradable polymers, particles composed of the biodegradable material, porous particles or particles of a water-soluble material. The foregoing particles enhance penetration of the solution, enlarge the area of contact and provide a culture area for the microorganisms. Prior to or simultaneously with the biochemical degradation, the mold is irradiated with, for example, ultraviolet rays. Thus, the molecule chains of the biodegradable polymers are cut to collapse the polymers so as to enhance the biochemical degradation. Moreover, substances for enhancing the degradation are added to the biodegradable polymers.

The present invention is able to manufacture structures having a variety of shapes by using the characteristic of the mold made of the biodegradable material, that is, the characteristic with which the mold is degraded into liquid and gas.

If the mold made of the above-mentioned material is used as the core, the core can easily be degraded and removed. The hollow portions created by the core are required to have passages capable of removing the solution containing the biochemically active substances, liquid of the degraded substances and the gas. Therefore, a hollow structure having an arbitrary shape can easily be manufactured.

When the above-mentioned characteristics are used to surround, for example, a spherical core, with a prepreg made of the composite material so as to be filled into the mold, a strong hollow structure can be constituted. Since a hollow portion having an arbitrary shape can be formed, a structure having a multiplicity of hollow ribs or a structure in the form of an isogrid shape can easily be manufactured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
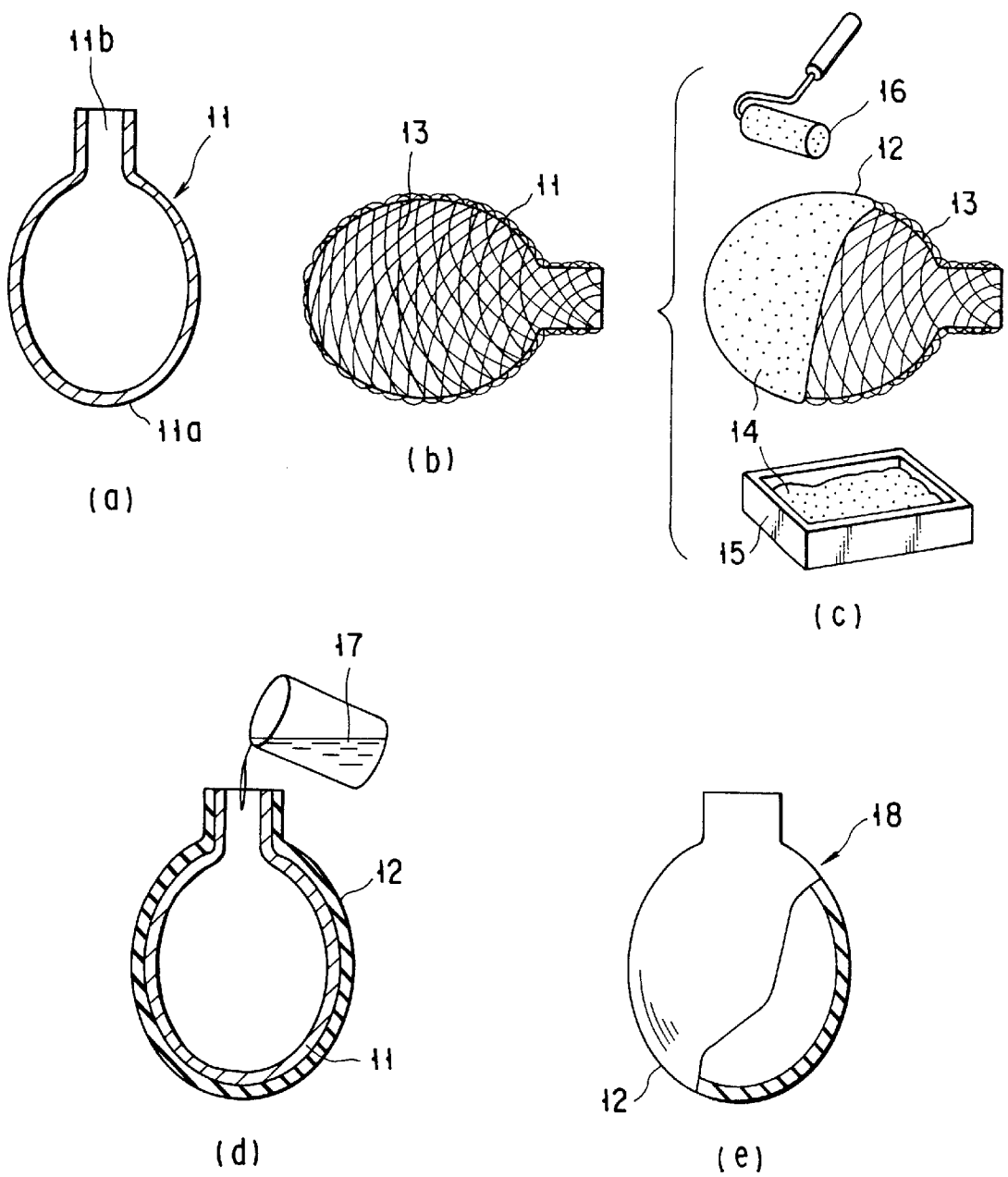
FIG. 1 is a diagram showing a process for manufacturing a hollow structure according to a first embodiment of the present invention.

Embodiments of the present invention will now be described with reference to the drawings. FIG. 1 shows a first embodiment in which a container in the form of a hollow structure is manufactured. Reference numeral 11 shown in FIG. 1($a$) represents a core made of biodegradable polymers, for example, microorganism type Biopol (trade name of Monsalt) in the form of a copolymer of hydroxybutyrate and valirate or Bionol (trade name of Showa Highpolymer) in the form of fatty acid polyester or polyester of succinic acid and butanediol/ethylene glycol. The core 11 is made of polymers which are degraded by dint of the action of biochemically active substance, such as bacteria or enzymes. The core 11 is molded by blow molding or injection molding and provided with a spherical core body 11$a$ having an elongated opening 11$b$.

The biodegradable polymer is not limited to the above-mentioned material and the same may be any one of a variety of materials, such as a microorganism type polymer, a chemical synthesis type polymer, a polymer using natural substances, a blend type polymer.

A CFRP or GFRP resin layer 12 is formed on the outer surface of the core 11. As a means for forming the resin layer 12, reinforcing fibers 13, for example, carbon fibers or glass fibers, are substantially uniformly wound around the outer surface of the core 11, as shown in FIG. 1($b$) (first step). Then, as shown in FIG. 1($c$), catalysts are added, and then non-hardened resin, such as unsaturated polyester, epoxy resin or phenol resin, or molten resin 14 are applied to the reinforcing fibers 13 (second step).

As a means for adding the non-hardened resin or the molten resin 14, the non-hardened resin or the molten resin 14 accommodated in a tray 15 is allowed to adhere to a roller 16 so as to be applied to the surface of the reinforcing fibers 13. The non-hardened resin or the molten resin 14 may be immersed in a molten resin tank (not shown) together with the core 11. The non-hardened resin or the molten resin 14 is impregnated into the reinforcing fibers 13 so that the resin layer 12 having a predetermined thickness is formed.

In this embodiment, a catalyst-added non-hardened resin or the molten resin 14 is unsaturated polyester, epoxy resin or phenol resin. The non-hardened resin or the molten resin 14 is hardened when it is allowed to stand at room temperatures. When a formed product is to be so formed as to have a smooth surface, the resin layer 12 is surrounded by a film before the resin layer 12 is hardened, and then the inside portion of the film is vacuum-sucked. Thus, the film is brought into hermetic contact with the resin layer 12. As a result, the outer surface of the resin layer 12 is smoothed.

After the resin layer 12 has been hardened as shown in FIG. 1($d$), muddy water containing biochemically active substances 17, such as bacteria and enzymes, specifically, microorganisms, is injected into the core 11 through an opening 11b of the core 11. Then, the core 11 is allowed to stand for several days to several weeks so that the core 11 is degraded (mainly into carbon dioxide and water) (third step).

After the core 11 has been degraded, the residues are discharged so that a container 18 made of the resin reinforced by the reinforcing fibers 13 is completed, as shown in FIG. 1(e). Even if the inner surface of the container 18 has a complicated shape, the residues of the core 11 are not left. That is, removal of the core 11 can easily be performed. As a result, excessive external force is not added to the container 18.

Figure 2:
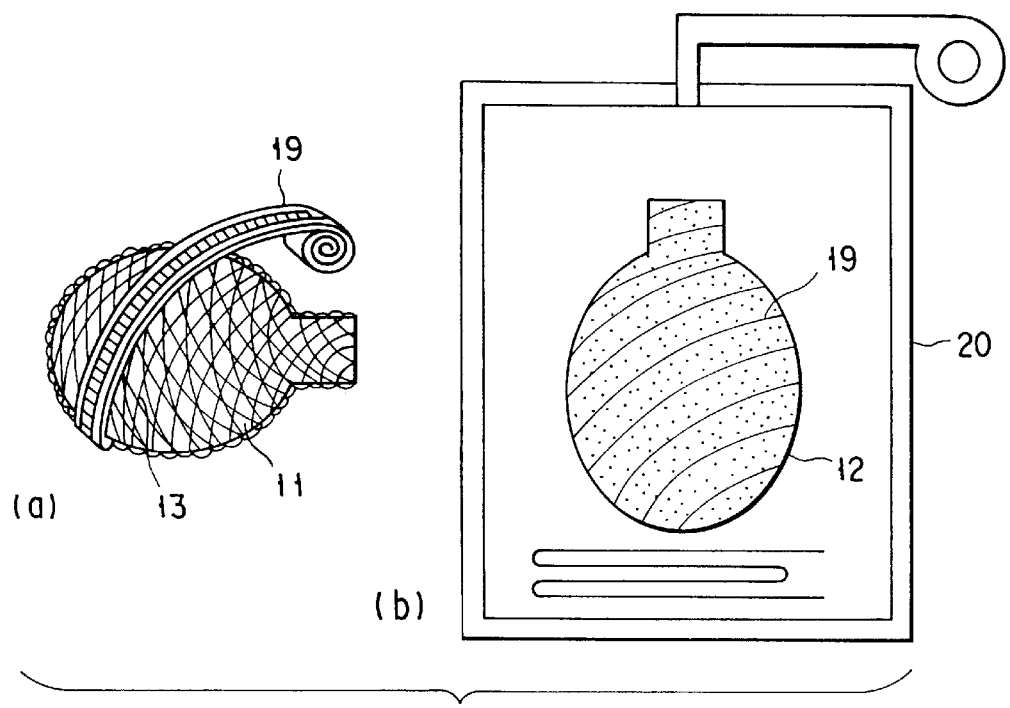
FIG. 2 is a diagram showing a process for manufacturing a hollow structure according to a second embodiment of the present invention.

FIG. 2 shows a second embodiment which is different from the first embodiment in that another method of forming the resin layer is employed. That is, as shown in FIG. 2(a), prepreg 19 is wound around the outer surface of the core 11 made of the biodegradable polymers (first step). Then, as shown in FIG. 2(b), the core 11 around which the prepreg 19 has been wound is accommodated in an autoclave 20. Then, the prepreg 19 is heated so as to harden the resin in the prepreg 19 that the resin layer 12 reinforced with the reinforcing resin is formed on the outer surface of the core 11 (second step). After the resin layer 12 has been hardened, the biochemically active substances 17, such as bacteria or enzymes, are injected into the core 11 through the opening 11b of the core 11. Then, the core 11 is allowed to stand for several days to several weeks so that the core 11 is degraded (third step) similarly to the first embodiment.

The resin layer 12 is surrounded by a film before the resin layer 12 is hardened, and then the inside portion of the film is vacuum-sucked. Thus, the film is brought into hermetic contact with the resin layer 12. As a result, the outer surface of the resin layer 12 is smoothed.

Although a variety of biodegradable polymers have been developed at present, all of the polymers have low degradation speeds. Therefore, long time is required to degrade the core 11. Hence, the biochemical degradation of the core must be enhanced in the above-mentioned process. When the above-mentioned method is put into practical use, degradation of the core must reliably be controlled.

Figure 3:
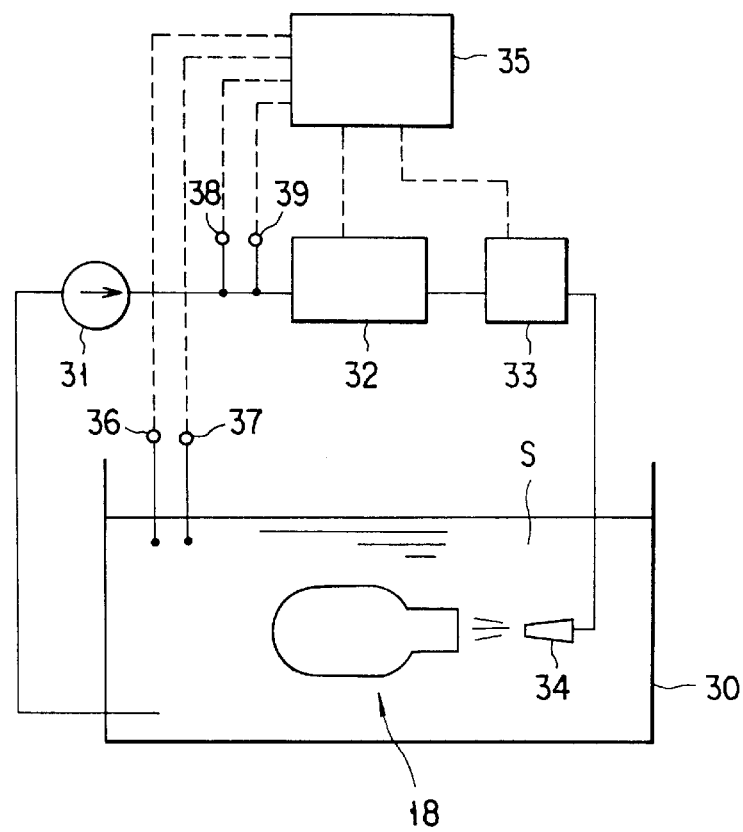
FIG. 3 is a schematic view showing an apparatus for use in a process for biochemically degrading a mold according to the present invention.

FIG. 3 schematically shows an apparatus for enhancing the degradation of the core and controlling degrading period of time. The apparatus includes a degrading tank 30. In the degrading tank 30, a solution S containing biochemically active substances, such as the microorganisms and enzymes, are accumulated. The solution S is, by a pump 31, circulated through a solution-component control unit 32 and a solution-temperature control unit 33. Since the container 18 has one opening, a solution is jetted from a nozzle 34 to the opening so that the solution S is circulated in the core.

The temperatures and components of the solution S in the degrading tank 30 and the solution which is circulated by the pump 31 are detected by temperature detectors 36 and 38 and component detectors 37 and 39. The component detectors 37 and 39 are units for detecting the components, pH and other factors of the solution S. Signals transmitted from the detectors are supplied to a control unit 35. The control unit 35 processes the supplied signals so as to transmit control signals to the solution-component control unit 32 and the solution-temperature control unit 33 so as to control the operations of the foregoing units and control the components and temperature of the solution S to satisfy predetermined ranges.

The biochemically active substances, for example, the microorganisms and enzymes, have an optimum temperature range for the operation thereof. The solution-temperature control unit 33 maintains the temperature of the solution to satisfy the optimum range so as to enhance the degradation of the core. Microorganisms have optimum pH for the operation thereof. In general, the operations of microorganisms deteriorate when the concentration of substances produced because of degradation of the core, that is, metabolites, such as carbon dioxide, has been raised. If the employed microorganisms are aerobic microorganisms, the microorganisms consume oxygen during the operation of the microorganisms. The solution-component control unit 32 maintains the components of the solution S to satisfy the optimum range for the operations.

When the above-mentioned apparatus is employed, the biodegradation of the core is enhanced to quickly complete the degradation. Moreover, the degradation condition can be controlled. Therefore, the period of time required to complete the degradation and whether or not the degradation has been completed can accurately be detected.

Figure 4:
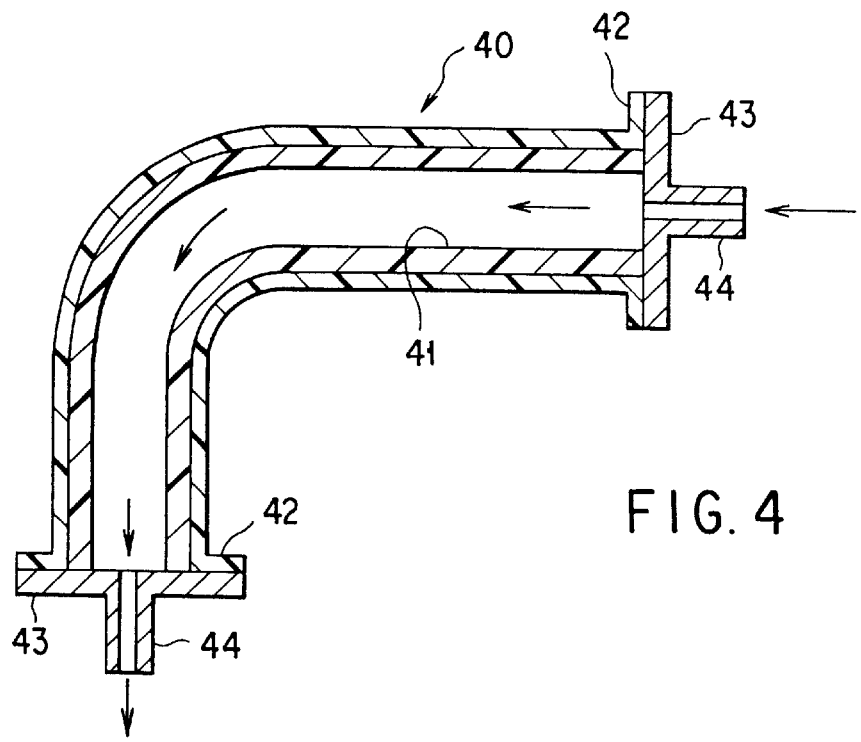
FIG. 4 is a vertical cross sectional view showing a first example of the structure of the mold according to the present invention.

The mold, for example, the core, may have a structure which enhances the biochemical degradation. If a structure 40 has an elbow-like shape having two opened ends as shown in FIG. 4, a hollow core 41 is employed. Moreover, a cover 43 having solution communication opening 44 is joined to a flanges 42 at each of the two ends of the structure 40. The solution is passed to the core 41 through the solution communication opening 44 so that the degradation of the core 41 is enhanced. In this embodiment, the structure 40 is not required to be accommodated in the degrading tank. A tube or the like is connected to the solution communication opening 44 to circulate the solution.

Figure 5:
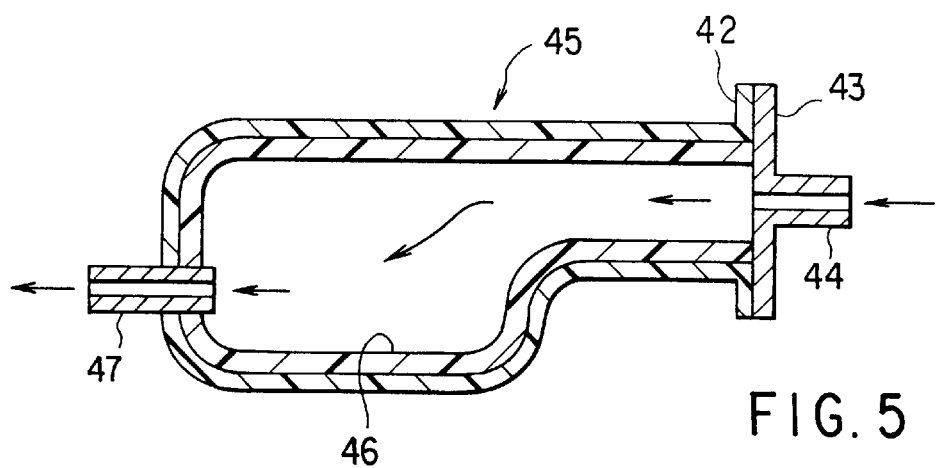
FIG. 5 is a vertical cross sectional view showing a second example of the structure of the mold according to the present invention.

FIG. 5 shows a second example of the structure of the core. In this example, a structure 45 has only one opened end. In this example, a core 46 is formed into a hollow shape. Moreover, a solution communication nozzle 47 is joined to another end opposite to the opened end. Thus, the solution is passed into the core 46 through the solution communication opening 44 of the cover 43 and the solution communication nozzle 47. In this case, the core 46 is degraded, and then the solution communication nozzle 47 is cut. The opened portion is closed with another composite material.

Figure 6:
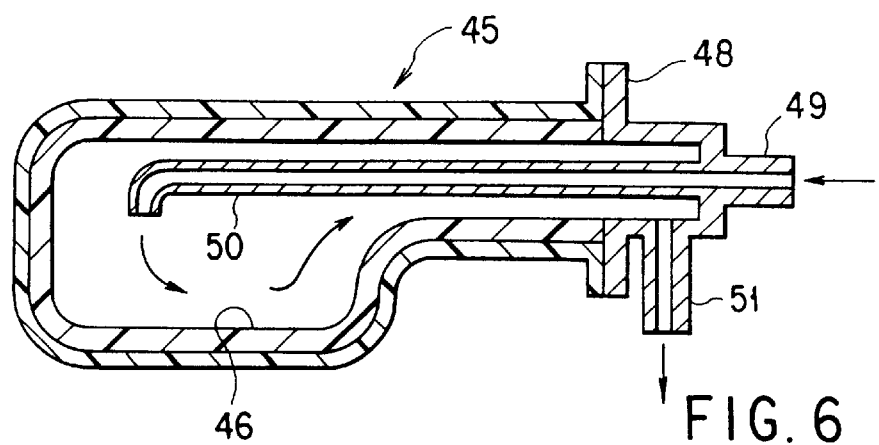
FIG. 6 is a vertical cross sectional view showing a third example of the structure of the mold according to the present invention.

FIG. 6 shows a third example of the structure of the core. In this example, a cover 48 having solution communication openings 49 and 51 and an insertion nozzle 50 is joined to an opened end of a structure 45. The solution is passed to the inside portion of a core 46 through the solution communication openings 49 and 51 and the insertion nozzle 50.

Figure 7:
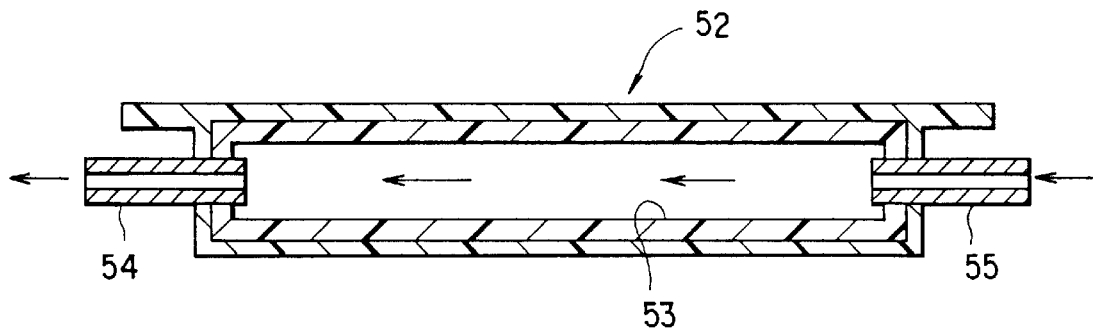
FIG. 7 is a vertical cross sectional view showing a fourth example of the structure of the mold according to the present invention.

FIG. 7 shows a fourth example of the core. Since a structure 52 according to this example has no opened end, a solution communication nozzle 54 is provided which penetrates the hollow core 53 and the wall of the structure 52. The solution is passed to the inside portion of the core 53 through the solution communication nozzle 54. After the biochemical degradation of the core 53 has been completed, the solution communication nozzle 54 is removed. Moreover, the opened end formed by the solution communication nozzle 54 is closed with another composite material, if necessary.

Figure 8:
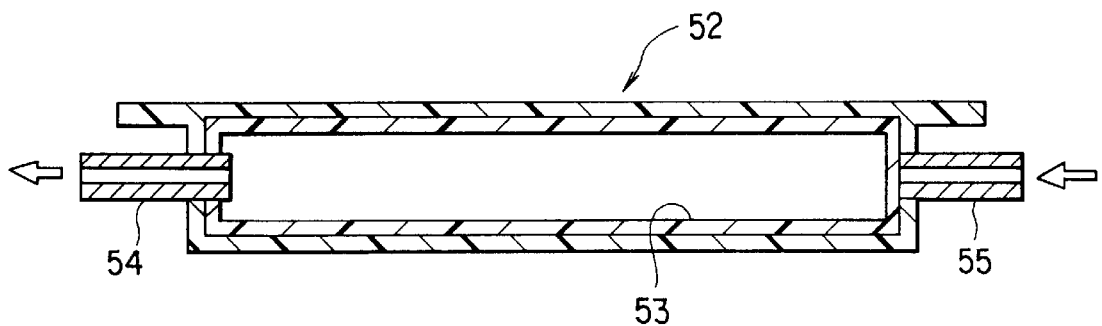
FIG. 8 is a vertical cross sectional view showing a fifth example of the structure of the mold according to the present invention.
Figure 9:
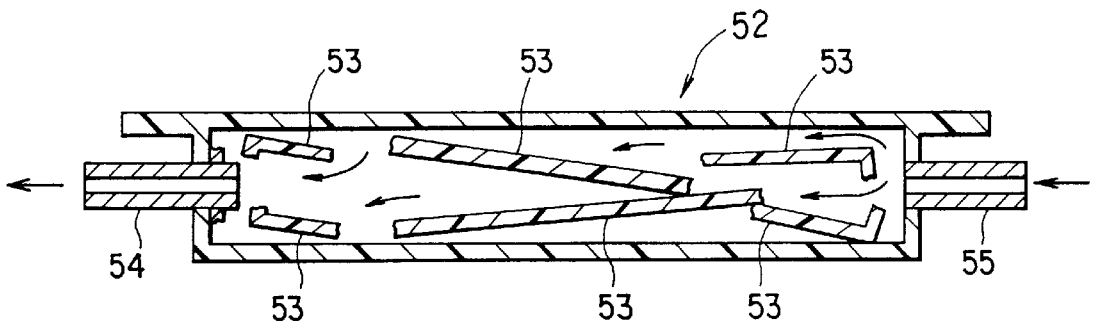
FIG. 9 is a vertical cross sectional view showing the fifth example of the structure of the mold according to the present invention.

FIGS. 8 and 9 show a fifth embodiment of the core. In this example, one of the solution communication nozzles 54 is allowed to communicate with the inside portion of the hollow core 53. Another solution communication nozzle 55 is allowed to communicate with a position between the outer surface of the hollow core 53 and the inner surface of a hollow structure 52. Air in the inside portion of the hollow core 53 is exhausted to realize a negative pressure. Moreover, a positive pressure is acted on the outside of the core 53 through the other solution communication nozzle 55.

The difference in the pressure between the outside portion and the inside portion is used so that the hollow core is collapsed as shown in FIG. 9. Then, the solution is passed through the solution communication nozzles 54 and 55. In this example, the core 53 is collapsed into fine pieces. Therefore, the degradation of the core 53 can furthermore be enhanced.

Figure 10:
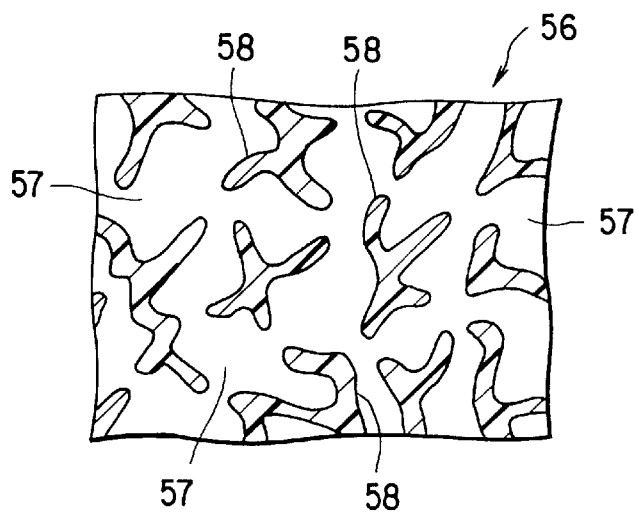
FIG. 10 is a vertical cross sectional view showing a sixth example of the structure of the mold according to the present invention.

As described above, the degrading efficiency can be improved by devising the microscopic structure of a material for making the mold, such as the core, as well as devising the shape and the structure of the core or the like. FIG. 10 shows a sixth example of the improvement in the microscopic structure of the mold.

In this example, a biodegradable polymer material 56 for constituting the mold is a foam structure having a multiplicity of open cells 57. Note that the foam having the open cells can be formed by a known technique. In this example, the solution is communicated or penetrated through the open cells 57. A wall 58 of the foregoing material has a small thickness and a large area of contact with the solution. Therefore, the biochemical degradation can efficiently be performed. In this example, the passage for the solution can be formed by the above-mentioned structure.

Figure 11:
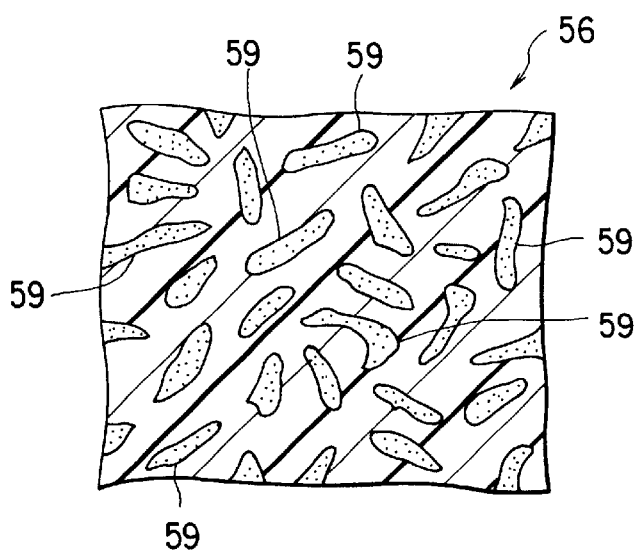
FIG. 11 is a vertical cross sectional view showing a seventh example of the structure of the mold according to the present invention.

FIG. 11 shows a seventh example of the microscopic contrivance of the mold. In this example, a multiplicity of particles 59 are mixed and dispersed in the material 56, such as the biodegradable polymer. The particles 59 are made of, for example, a biodegradable material or water-soluble material. It is preferable that the particles 59 are made of a porous material. It is further preferable that the particles 59 have elongated shapes.

The material of the particles 59 is exemplified by ashes of burning dust, chips of wood and pulp. The foregoing materials are biodegradable material and also serve as culture area for microorganisms to enhance the degradation. The particles 59 are further exemplified by fly ashes, starch, chemical fertilizer and water-soluble inorganic substances. Since the above-mentioned particle are dissolved in the solution and form small cavities at the positions of the particles, the degradation of the polymer material 56 is enhanced. Note that the chemical fertilizer and so forth serve as nutrient for microorganisms. If the particles 59 have the elongated shapes, the solution can furthermore deeply penetrate the core, the degradation is furthermore enhanced.

Figure 12:
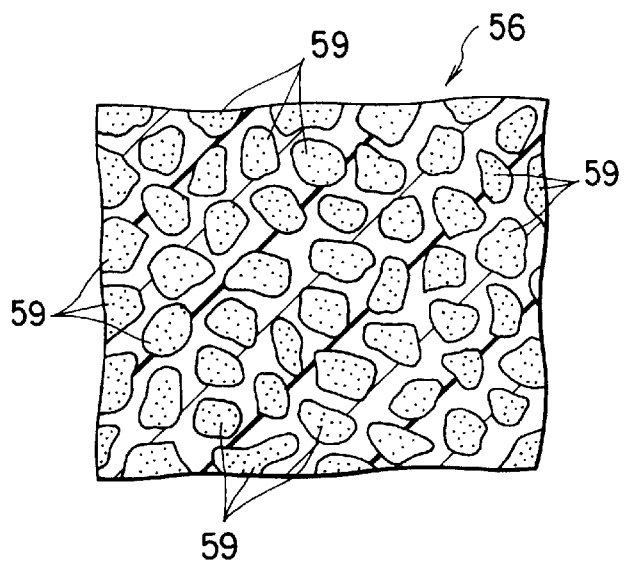
FIG. 12 is a vertical cross sectional view showing an eighth example of the structure of the mold according to the present invention.

FIG. 12 shows an eighth example of the microscopic structural contrivance. In this example, particles similar to those according to the seventh example are employed. The quantity of the particles 59 with respect to the quantity of the biodegradable polymers is enlarged. The polymer is used as a binder for the particles 59. In this example, the solution is furthermore deeply and quickly penetrate the core. Moreover, the polymer portions have large thicknesses. Therefore, the degradation can furthermore be enhanced.

A molecular structural contrivance of the polymer enables the degradation to be enhance as well as the microscopic structural contrivance of the biodegradable polymer.

Figure 13:
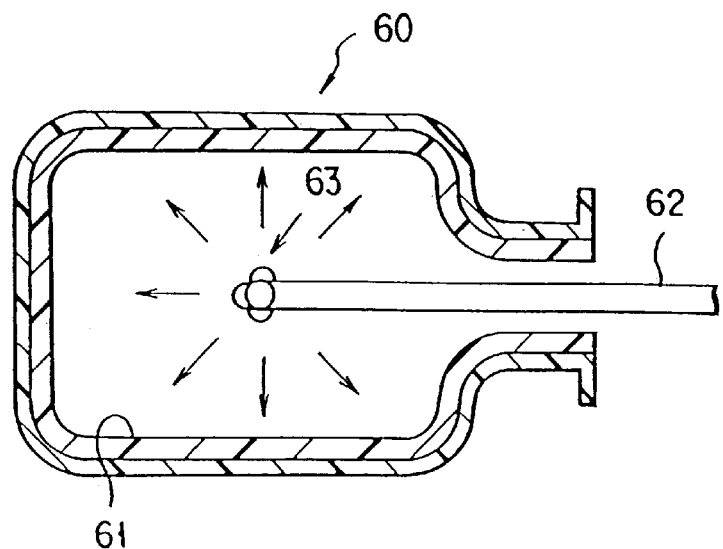
FIG. 13 is a vertical cross sectional view showing a process which is performed prior to the process for degrading the mold according to the present invention.

FIG. 13 shows an example of a process for enhancing the degradation of the polymers. In this example, an optical guide 62, such as an optical fiber, or an optical system combined with an optical element such as a mirror, is inserted into a hollow core 61 through an end of an opening of a structure 60. Light, for example, ultraviolet rays, is transmitted through the optical guide 62. A radiant optical device 63 disposed at the leading end of the optical guide 62 radiates light so that the inner surface of the hollow core 61 is irradiated with light.

When the ultraviolet rays are applied as described above, main chains of molecules of the biodegradable polymers of the core 61 are cut. Thus, the polymers molecular structure is collapsed. As a result of the collapse, the polymers are made to be brittle. Moreover, fine irregularities and cracks are formed because of separation of the surface. Therefore, penetration of the solution is enhanced and the surface area is enlarged. Since the main chains are cut, the biochemical degradation of the polymers is furthermore enhanced.

To effectively cut the main chains of the polymers molecules by dint of light as described above, it is preferable that grafting copolymerization of light functional groups with the polymers is performed. Another effective means is to add an enhancer for light degradation or microorganism degradation to the polymers. The foregoing enhancers enhance, for example, the degradation by dint of microorganisms. Moreover, conditions are realized under which polymers are oxidized and degraded by dint of an automatic oxidization effect, metabolite, such as carbon dioxide, of microorganisms is degraded and degradation by dint of microorganisms is enhanced. As the foregoing degradation enhancer, an enhancer DEGRANOVON which is trade name of NOVON JAPAN INC. is available.

The irradiation with light, such as ultraviolet rays, may be performed simultaneously with the biochemical degradation process. If an appropriate type of microorganisms for use to perform the degradation is selected, the degradation effect can furthermore be enhanced by dint of the irradiation with light.

The method of the degradation and collapse of the biodegradable polymer is not limited to the light irradiation. The degradation and collapse may be performed with, for example, heat generated when the composite material is hardened by heating the structure in an autoclave.

Although the description has been made about a structure having a relatively simple shape, a structure having a complicated shape can be manufactured by using the characteristic of the present invention.

Figure 14:
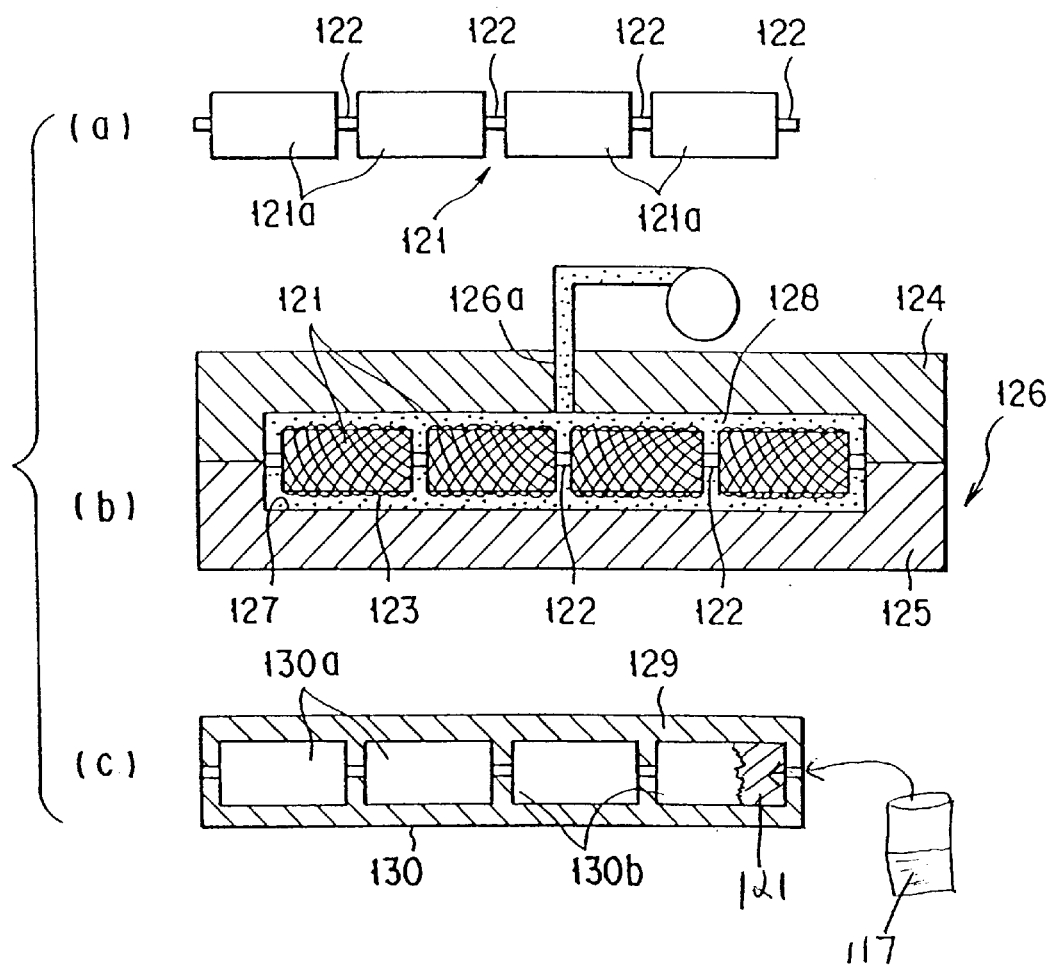
FIG. 14 is a diagram showing a process for manufacturing a hollow structure according to a third embodiment of the present invention.

FIG. 14 shows a third embodiment of the present invention which is different from the first and second embodiments in the shape of the core. That is, as shown in FIG. 14($a$), a core 121 made of biodegradable polymers is composed of a plurality of tubular or cylindrical core elements 121$a$, ..., The core elements 121$a$, ..., are connected to one another by connectors 122 provided for the axial portion thereof. Therefore, the connected core elements 121$a$, ..., are disposed apart from one another for predetermined distances in the axial direction.

The core 121 is employed such that reinforcing fibers 123 which are carbon fibers or glass fibers are substantially uniformly wound around the outer surface of the core 121 (first step). In this case, prepreg may be wound as is performed in the second embodiment. Then, as shown in FIG. 14($b$), and then the core 121 around which the reinforcing fibers 123 have been wound is introduced into a cylindrical cavity 127 of a mold 126 composed of an upper mold 124 and a lower mold 125.

In the foregoing state, non-hardened resin, such as unsaturated polyester, epoxy resin or phenol resin or the molten resin 128 is, under pressure, injected through a resin injection port 126$a$ of the mold 126. Thus, the non-hardened resin or the molten resin 128 is filled into a portion between the cavity 127 and the core 121 and gaps in the core 121. Thus, a resin layer 129 having the reinforcing fibers 123 embedded therein is formed (second step).

The resin layer 129 is hardened at room temperatures or with heat, and then the core 121 having the resin layer 129 is taken from the mold 126. As described above, the core elements 121a, . . . , for constituting the core 121 are connected to one another by the connectors 122. Therefore, injection of biochemically active substances 117, such as bacteria or enzymes, into the core 121 at either end results in the biochemically active substances 117 being supplied to the core element 121a, the connectors 122 and the core element 121a in this sequential order. As a result, the core 121 is degraded (third step).

Therefore, a composite molded product 130 can be obtained which has independent cylindrical hollow portions 130a formed apart from one another for predetermined distances in the axial direction, as shown in FIG. 14(c). The composite molded product 130 has partition wall 130b formed by the resin layer 129 charged between the core elements 121a. Therefore, the partition wall 130b serves as a bulkhead so that the composite molded product 130 has increased strength.

In the foregoing process, the various means for enhancing the degradation of the core may appropriately be employed.

Figure 15:
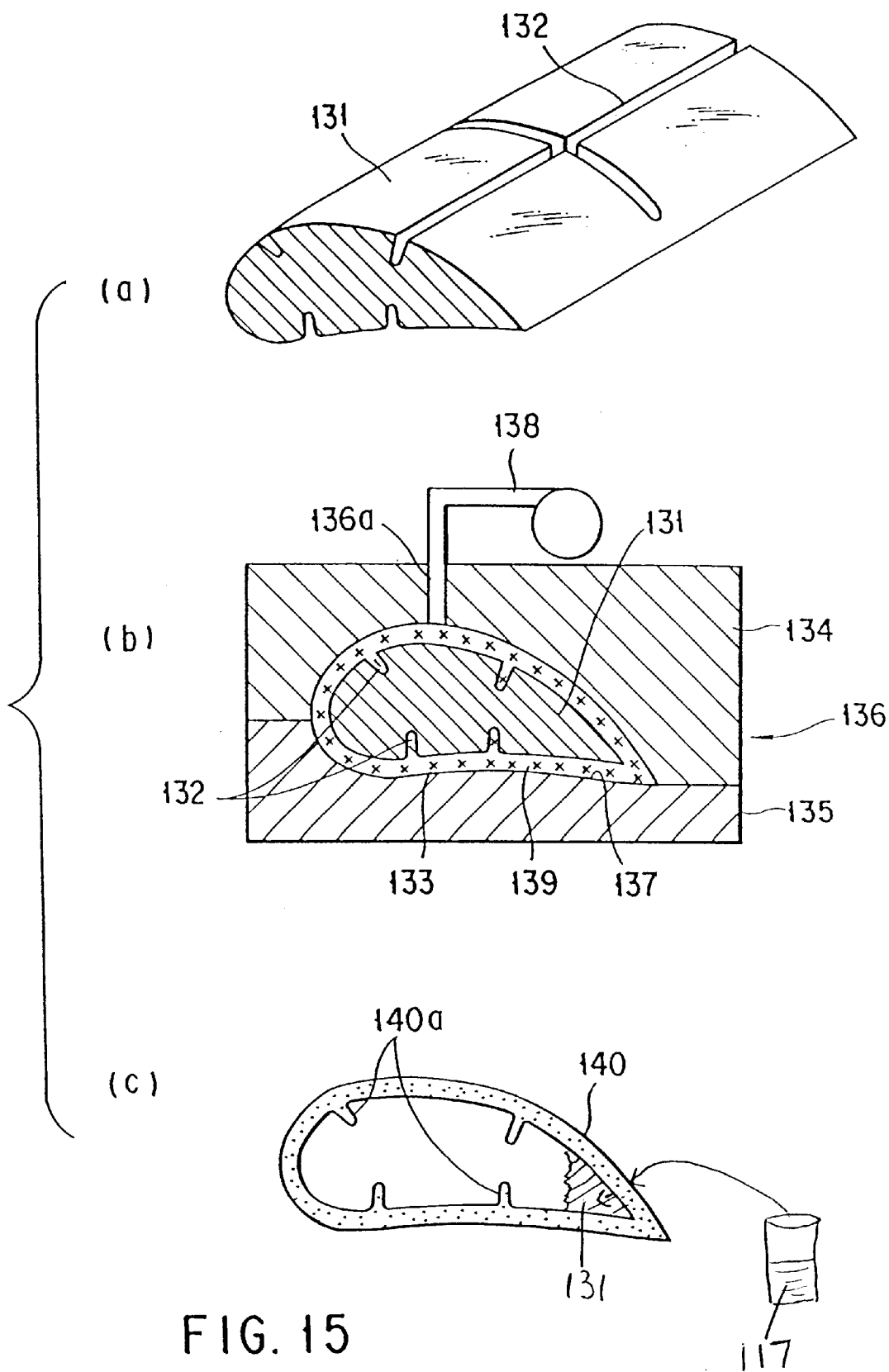
FIG. 15 is a diagram showing a process for manufacturing a hollow structure according to a fourth embodiment of the present invention.

FIG. 15 shows a fourth embodiment with which wings of an airplane in the form of a hollow structure are manufactured by a RTM (Resin Transfer Molding) method. As shown in FIG. 15(a), grooves 132 are provided for the upper and lower surfaces of a core 131 in the longitudinal and lateral directions for forming ribs by machining, the core 131 being made of biodegradable polymers corresponding to the shape of a wing of an airplane.

The above-mentioned core 131 is employed in this embodiment. Reinforcing fibers 133 which are carbon fibers or glass fibers are wound around the outer surface of the core 131 to have portions of corresponding thickness (first step). In this case, prepreg may be wound as is performed in the second embodiment. Then, as shown in FIG. 15(b), the core 131 around which the reinforcing fibers 133 have been wound is introduced into the wing-shape cavity 137 of a mold 136 composed of an upper mold 134 and a lower mold 135.

In the above-mentioned state, non-hardened resin, such as unsaturated polyester, epoxy resin or phenol resin or the molten resin 138 is, under pressure, injected through a resin injection port 136a of the mold 136. Thus, the non-hardened resin or the molten resin 138 is injected into a gap between the cavity 137 and the core 131 and into the groove 132. As a result, a resin layer 139 having the reinforcing fibers 133 embedded therein is formed (second process).

The resin layer 139 is hardened at room temperatures or with heat, and then the core 131 having the resin layer 139 is taken from the mold 136. Since the two lengthwise-directional ends of the core 131 are in contact with the end surface of the mold 136, the two ends of the core 131 are exposed over the resin layer 139. When biochemically active substances 117, such as bacteria or enzymes, are injected into the core 131 (third step), the core 131 is degraded by the biochemically active substances. As a result, the resin layer 139 having the reinforcing fibers 133 embedded therein is left.

Therefore, as shown in FIG. 15(c), a hollow composite molded product 140 having ribs 140a formed therein and formed into the wing shape can be obtained. In this embodiment, the two lengthwise-directional ends of the core 131 are brought into contact with the end surface of the mold 136 to cause the core 131 to expose over the resin layer 139. When the two lengthwise-directional ends of the core 131 are made to be apart from the end surface of the mold 136, a hollow resin layer 139 can be formed which has two closed ends. In this case, an opening is provided for a portion of the resin layer 139 so that biochemically active substances, such as bacteria or enzymes, are injected through the opening.

Figure 16:
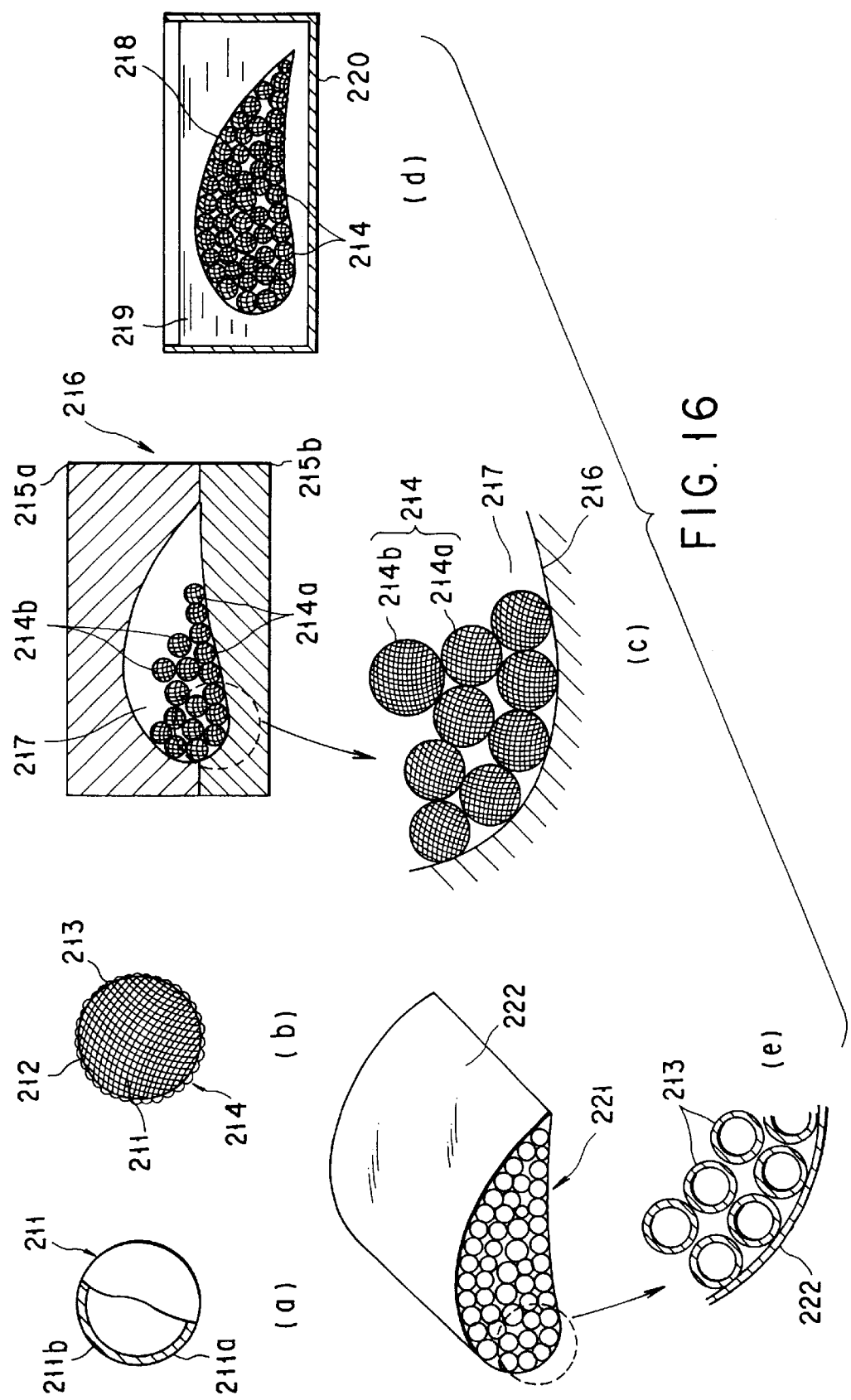
FIG. 16 is a diagram showing a process for manufacturing a porous structure according to a fifth embodiment of the present invention.

The manufacturing method according to the present invention is able to manufacture a structure having a further complicated shape. Although the wing in the form of the honeycomb structure has high strength and rigidity as described above, there arises a problem in that the honeycomb structure cannot easily be manufactured. FIG. 16 shows a method of manufacturing a hollow-structure wing having the honeycomb structure.

In FIG. 16(a), reference numeral 211 represents a hollow spherical member made of biodegradable polymers, for example, microorganism type Biopol (trade name of Monsalt) in the form of a copolymer of hydroxybutyrate and valirate or Bionol (trade name of Showa Highpolymer) in the form of fatty acid polyester or polyester of succinic acid and butanediol/ethylene glycol. The foregoing biodegradable polymer is a polymer which is degraded by dint of the action of the biochemically active substances, such as oxygen. The spherical member 211 can be manufactured by blow molding or injection molding. An opening 211b is formed in a portion of the spherical-member body 211a. The diameter of the spherical-member body 211a is several millimeters to tens of millimeters. It is preferable that spherical members having a variety of diameters are employed in place of those having the same diameter.

A CFRP or GFRP resin layer is formed on the outer surface of the spherical member 211. As a means for forming resin layer, reinforcing fibers 213 which are carbon fibers or glass fibers impregnated with non-hardened resin 212, such as unsaturated polyester, epoxy resin or phenol resin, are substantially uniformly wound around the outer surface of the spherical member 211, as shown in FIG. 16(b). The non-hardened resin 212 are wound to have a thickness with which the fibers are slightly apart from each other (rough winding is required because the biochemically active substances, such as bacteria and enzymes cannot easily be introduced if the fibers are wound too closely). Thus, reinforcing-fiber spherical members 214 are formed (first step).

Then, as shown in FIG. 16(c), a cavity 217 of a mold 216 composed of an upper mold 215a and a lower mold 215b is closely filled with the multiplicity of the reinforcing-fiber spherical members 214. Then, the reinforcing-fiber spherical members 214 are heated or placed at room temperatures so that the non-hardened resin 212 is hardened. As a result, the reinforcing-fiber spherical members 214 are integrally combined with one another as the non-hardened resin 212 is hardened (second step). The reinforcing-fiber spherical members 214 having the same diameters may be closely filled. Reinforcing-fiber spherical members 214a having small diameters may be disposed in the outer peripheral portion of the cavity 217 and reinforcing-fiber spherical members 214b having large diameters may be disposed in the central portion of the cavity 217. In this case, the reinforcing-fiber spherical members 214 are disposed at a high density in the outer layer, while the same are disposed at a low density in the inner layer.

After a spherical-member aggregate 218 composed of the multiplicity of the reinforcing-fiber spherical members 214 has been molded as described above, the spherical-member aggregate 218 is taken from the mold 216. As shown in FIG. 16(d), the spherical-member aggregate 218 is injected into a tank 220 accommodating biochemically active substances 219, such as bacteria and enzymes, specifically muddy water containing microorganisms so that the spherical-member aggregate 218 is immersed in the biochemically active substances 219. Then, the spherical-member aggregate 218 is allowed to stand for several days to several weeks so that the biochemically active substances 219 penetrate the reinforcing-fiber spherical members 214 to penetrate the spherical members 211 made of biodegradable polymers disposed in the spherical-member aggregate 218. As a result, the spherical members 211 are degraded (mainly into carbon dioxide and water) (third step).

After the spherical members 211 have been degraded, the residues of the spherical members 211 are discharged. Thus, a porous structure 221 composed of the reinforcing fibers 213 and the resin as shown in FIG. 16(e) can be obtained. Then, the porous structure 221 is employed as the core, and then a surface plate 222 is joined so that, for example, a wing of an airplane made of the composite material is formed.

Figure 17:
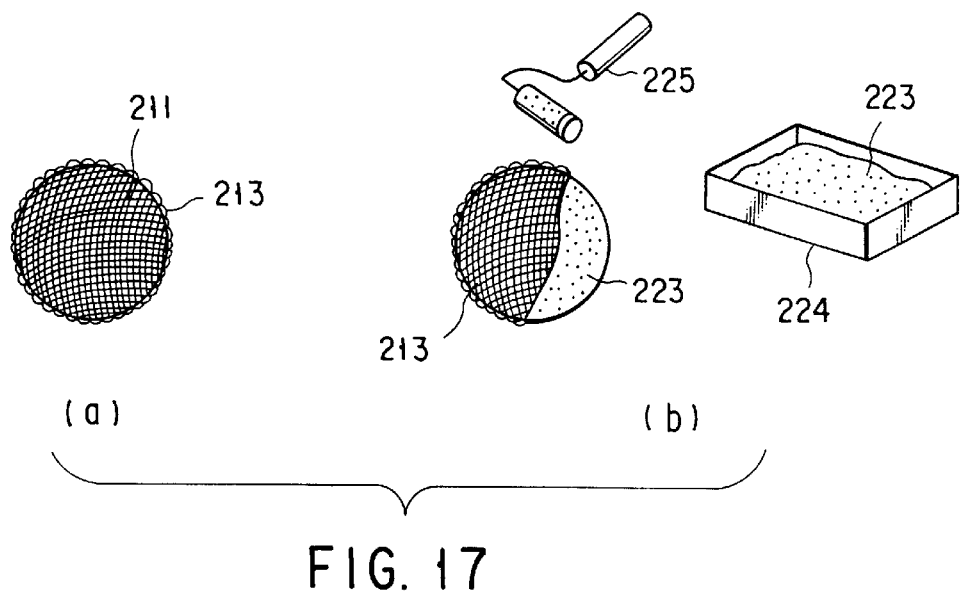
FIG. 17 is a diagram showing a process for manufacturing a porous structure according to a sixth embodiment of the present invention.

FIG. 17 shows a sixth embodiment which is different from the fifth embodiment in the method of forming the resin layer. That is, as shown in FIG. 17(a), reinforcing fibers 213, which are carbon fibers or glass fibers, are substantially uniformly wound around a spherical member 211 made of biodegradable polymers to have a thickness with which the fibers are slightly apart from each other (first step). Then, enzymes are added to the reinforcing fibers 213. Then, as shown in FIG. 17(b), the reinforcing fibers 213 are coated with non-hardened resin, such as unsaturated polyester resin, epoxy resin or phenol resin, or molten resin 223 (second step). As a means for adding the molten resin 223, the non-hardened resin or the molten resin 223 accommodated in a tray 224 may be allowed to adhere to a roller 225 so as to be applied to the surface of the reinforcing fibers 213. The molten resin 223 may be immersed in a molten-resin tank (not shown) together with the spherical members 211. Note that the third step is similar to that according to the first embodiment.

Figure 18:
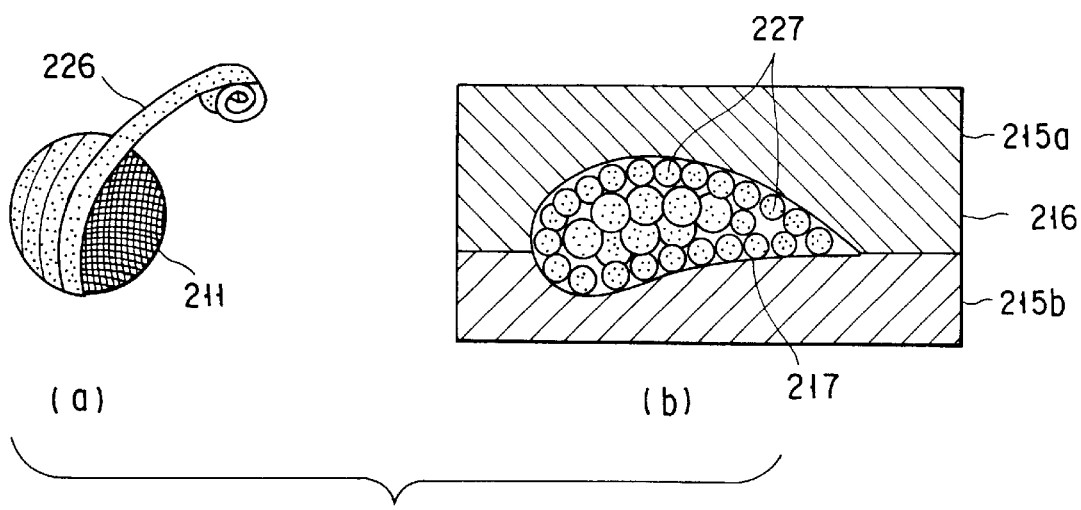
FIG. 18 is a diagram showing a process for manufacturing a porous structure according to a seventh embodiment of the present invention.

FIG. 18 shows a seventh embodiment which is different from the fifth and sixth embodiments in the method of forming the resin layer. That is, as shown in FIG. 18(a), prepreg 226 is wound around the outer surface of a spherical member 211 made of biodegradable polymers (first step). Then, as shown in FIG. 18(b), the spherical members 211 around each of which the prepreg 226 has been wound, that is, a multiplicity of reinforcing-fiber spherical members 227 are closely filled. Then, the reinforcing-fiber spherical members 227 are heated to harden the resin in the prepreg 226, causing the reinforcing-fiber spherical members 227 to integrally be combined with one another as the resin is hardened (second step). Note that the third step is similar to that according to the fifth embodiment.

Figure 19:
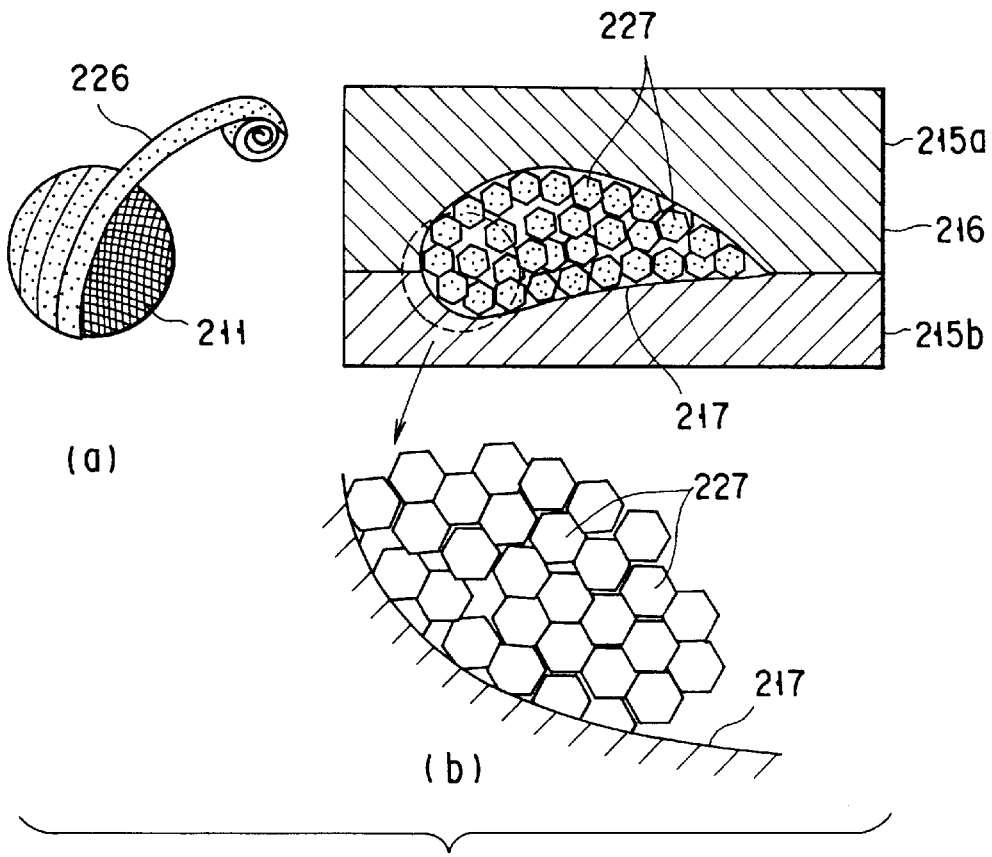
FIG. 19 is a diagram showing a process for manufacturing a porous structure according to an eighth embodiment of the present invention.

FIG. 19 shows an eighth embodiment which is different from the fifth to seventh embodiments in the method of heating and hardening the reinforcing-fiber spherical members 227. That is, as shown in FIG. 19(a), prepreg 226 is wound around the outer surface of a spherical member 211 made of biodegradable polymers (first step). Then, as shown in FIG. 19(b), the spherical members 211 around each of which the prepreg 226 has been wound, that is, a multiplicity of reinforcing-fiber spherical members 227 are closely filled into a cavity 217 of a mold 216 composed of an upper mold 215a and a lower mold 215b. Then, the reinforcing-fiber spherical members 227 are heated, causing the resin in the prepreg 226 to be expanded. As a result, adjacent reinforcing-fiber spherical members 227 press against one another so that gaps are plugged. Thus, the reinforcing-fiber spherical members 227 are formed into polygonal shapes each having a hexagonal or octagonal cross sectional shape. That is, irregular polyhedrons are formed and thus the reinforcing-fiber spherical members 227 are hardened. Moreover, the reinforcing-fiber spherical members 227 are integrally combined with one another as the resin is hardened (second step). Note that the third step is similar to that according to the fifth embodiment.

When the reinforcing-fiber spherical members 227 closely filled into the cavity 217 of the mold 216 are heated, air is sucked from the outside of the mold 216 to realize a vacuum state. Thus, effects can be obtained in that heat expansion of the resin can be enhanced and degree of adhesion among the reinforcing-fiber spherical members 227 to one another can be raised. When each of the spherical members 211 is formed into a hollow structure and air or volatile liquid, a foaming agent generating a gas by heating, or the like is previously filled, the fluid is expanded when the temperature is raised. As a result, expansion of the spherical members 211 is enhanced and the internal pressure is raised. Because of the foregoing effects, the degree of adhesion among the reinforcing-fiber spherical members 227 to one another can be raised.

Figure 20:
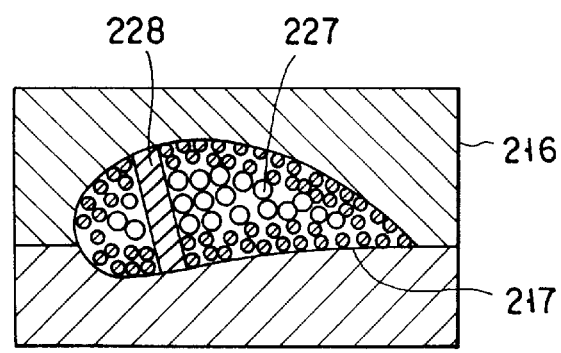
FIG. 20 is a diagram showing a process for manufacturing a porous structure according to a ninth embodiment of the present invention.

FIG. 20 shows a ninth embodiment having a structure that another reinforcing member 228 is added to a portion which requires highest strength is added to the method of manufacturing the hollow structure according to the fifth embodiment. When the reinforcing-fiber spherical members 214 are filled in the cavity 217 of the mold 216, the reinforcing member 228 is placed in the cavity 217. Thus, a hollow structure having satisfactory strength can be manufactured.

Figure 21:
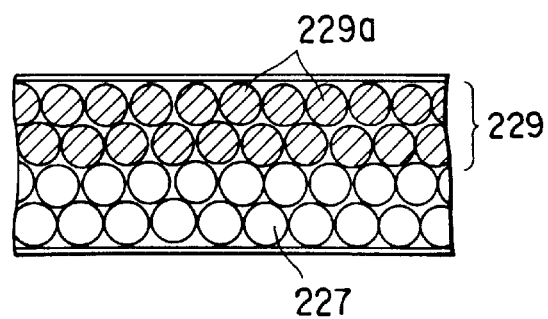
FIG. 21 is a diagram showing a process for manufacturing a porous structure according to a tenth embodiment of the present invention.
Figure 22:
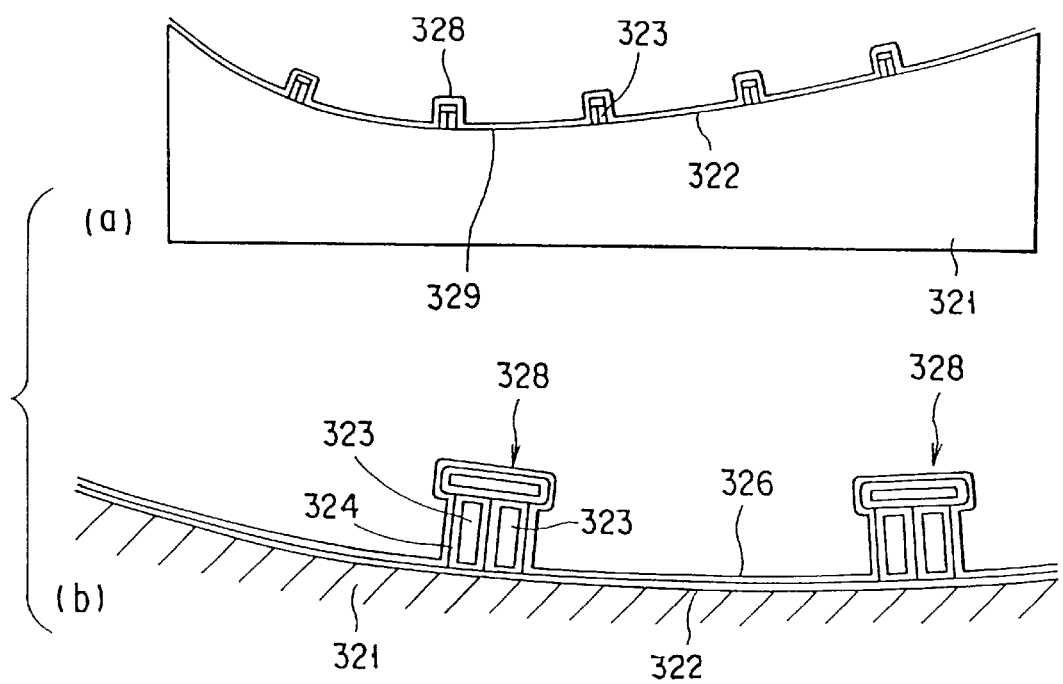
FIG. 22 is a diagram showing a process for manufacturing a rib structure according to an eleventh embodiment of the present invention.

FIG. 21 shows a tenth embodiment for manufacturing a hollow structure having an excellent heat insulation characteristic such that a multiplicity of, for example, spherical heat insulating members 229a are filled to constitute a heat insulating layer 229. In the foregoing case, a reinforcing-fiber layer similar to that formed around the spherical members 211 is previously formed around the spherical heat insulating members 229a.

When the reinforcing-fiber spherical members 214 are filled in the cavity 217 of the mold 216, the multiplicity of the spherical heat insulating members 229a are filled in the cavity 217 to form layers. Then, heating is performed so that the reinforcing-fiber spherical members 214 and the spherical heat insulating members 229a are combined with one another. Thus, a hollow structure having an excellent heat insulating characteristic can be manufactured. Although the description has been made about the structure in which the heat insulating material is injected, a sound absorbing material is employed in place of the spherical heat insulating members 229a when the structure must have a sound absorbing characteristic or a sound insulating characteristic. Thus, a structure made of the porous structure having an excellent sound absorbing characteristic can be obtained by a similar method.

When a heat insulating layer is attempted to be formed by the conventional honeycomb sandwich plate, a partitioned heat insulating layer cannot be formed because the heat insulating material is injected into the overall body of the honeycomb core in the direction of the thickness of the same because the honeycomb core has no partition in the direction of the thickness. When the method according to the tenth embodiment is employed, a heat insulating layer having an arbitrary thickness meeting a purpose can be formed.

In each of the above-mentioned embodiments, the spherical members are manufactured by blow molding or injection molding. Moreover, complete spheres are employed. The spherical members are not required to be complete spheres. Cubes having rounded corners or members each having an elliptic cross sectional shape may be employed.

A method of manufacturing a rib structure having hollow ribs, such as the wings of an airplane, will now be described. FIGS. 22 to 25 show an eleventh embodiment for manufacturing a wing of an airplane which is a hollow rib structure.

To form the outer surface of the wing of an airplane, a jig 321 having a surface formed into a concave shape corresponding to the outer shape of the wing of the airplane must be used. The jig 321 is formed to correspond to the size of the wing of an airplane. A plurality of layers of prepreg 322 serving as a base layer are stacked. After the prepreg 322 has been placed, cores 323 are disposed on the prepreg 322. The core 323 is made of, for example, microorganism type Biopol (trade name of Zeneka) in the form of a copolymer of hydroxybutyrate and valirate or Bionol (trade name of Showa Highpolymer) in the form of fatty acid polyester or polyester of succinic acid and butanediol/ethylene glycol. The cores 323 can be degraded by the actions of the biochemically active substances, such as bacteria and enzymes. Therefore, an advantage can be realized to protect the global atmosphere.

Figure 23:
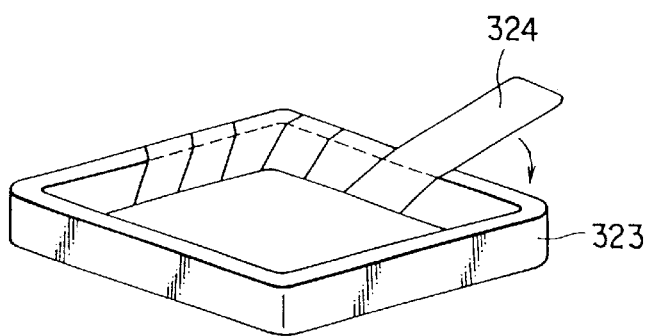
FIG. 23 is a perspective view showing the shape of a core member according to the eleventh embodiment of the present invention.

The core 323 has a cross sectional shape which is, for example, rectangular shape as shown in FIG. 23. A tape-shape prepreg 324 is wound around the core 323. The shape of the core 323 is not limited to the rectangle. When an isogrid structure is manufactured, the core 323 may be formed into a triangular shape.

The cores 323 around each of which the prepreg 324 has been wound are placed on the prepreg 322 which is the base layer. In this case, the adjacent cores 323 are closely disposed.

Figure 24:
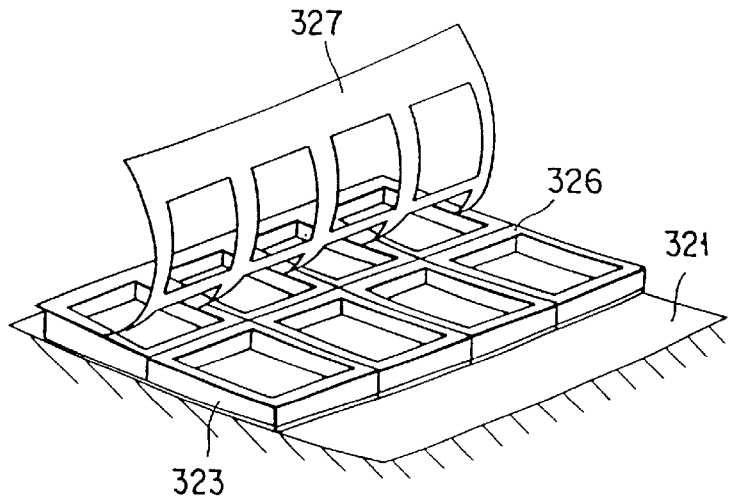
FIG. 24 is a diagram showing a process for laminating prepreg according to the eleventh embodiment of the present invention.

As shown in FIG. 24, the cores 323 are disposed on the prepreg 322, and then one or more layers of the prepreg 326 are disposed. Then, prepreg 327 made of CF cloth and serving as a final layer is laminated. The CF cloth prepreg 327 has predetermined strength because continuous fibers are mixed. Moreover, spaces in which the ribs 328 are not formed are previously formed to correspond to the cores 323. As a result, the prepreg 327 is disposed at the position corresponding to the upper surface of the ribs 328. The prepreg 326 may be omitted. In this case, CF cloth prepreg 327 is directly disposed on the cores 323.

The overall body of a product molded by an autoclave is usually covered with a heat-resisting film before the heat hardening process. Then, inside air is sucked to realize a vacuum state so as to raise the degree of adhesion among the elements and the prepreg. In the foregoing state, the temperature is raised to a high level.

Then, the jig 321 is heated to a predetermined temperature so that the cores 323 and prepreg 322, 324 and 326 stacked on the jig 321 are brought into hermetically contact with one another and integrated with one another. Since the prepreg 326 is hardened, the ribs 328 are constituted.

Figure 25:
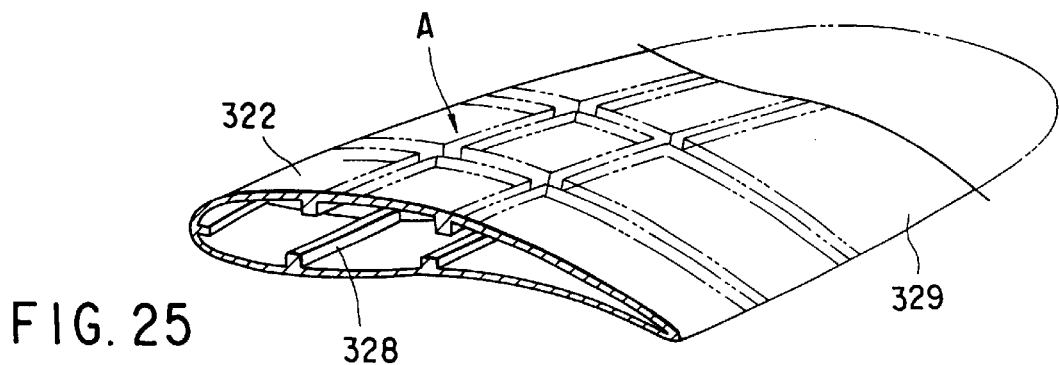
FIG. 25 is a perspective view showing a hollow structure which is manufactured in the eleventh embodiment of the present invention.

As shown in FIG. 25, a wing component 329 having lattice ribs 328 formed on the inside portion of the curved surface can be obtained. Two wing components 329 are manufactured, and then the two wing components 329 are stacked in such a manner that the curved surfaces are disposed opposite to each other. Then, the outer peripheries of the two wing components 329 are connected to each other by bonding or welding or with a connecting member. Thus, a hollow structure A having the ribs 328 and serving as a wing can be obtained.

The shape of the core 323 is not limited to the rectangular shape or the triangular shape. For example, the core may have a structure composed of elongated members and columnar members acting as bridges between the elongated members.

To degrade and remove the cores 323 made of the biodegradable polymers, holes are formed at arbitrary positions of prepreg 322, 324 and 326 which cover the cores 323. A water solution containing biochemically active substances, such as bacteria and enzymes, for example, microorganisms, is injected into the core 323 through the holes. When the cores 323 are allowed to stand for several days to several weeks in the foregoing state, the cores are degraded (mainly into carbon dioxide and water).

After the cores 323 have been degraded, the residues of the cores 323 are discharged through the holes. Thus, the portions in which the cores 323 have existed are formed into hollow portions. As a result, wing components 329 having hollow ribs 328 can be completed. As a result, a rib structure 320, the weight of which can be reduced and which has required strength, can be formed.

The hollow structure A formed by stacking the wing components 329 manufactured by the above-mentioned manufacturing method is formed such that the wing components are integrally formed with the ribs. Therefore, the strength can be raised as compared with the strength of the wing components 329 which are joined to each other. Since the cores 323 are made of the biodegradable polymers, degradation of the biodegradable polymers results in only the prepreg 324 which has covered the biodegradable polymers is left. As a result, the hollow rib can be formed. As a result, the weight of the rib structure can be reduced.

When sheet or tape shape prepreg 322, 324 and 326 are stacked or wound, a wing member having a required shape and thickness can be formed.

Figure 26:
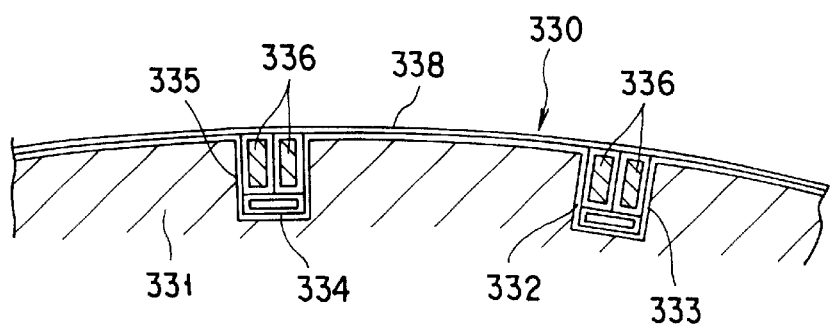
FIG. 26 is a diagram showing a process for manufacturing a rib structure according to a twelfth embodiment of the present invention.
Figure 27:
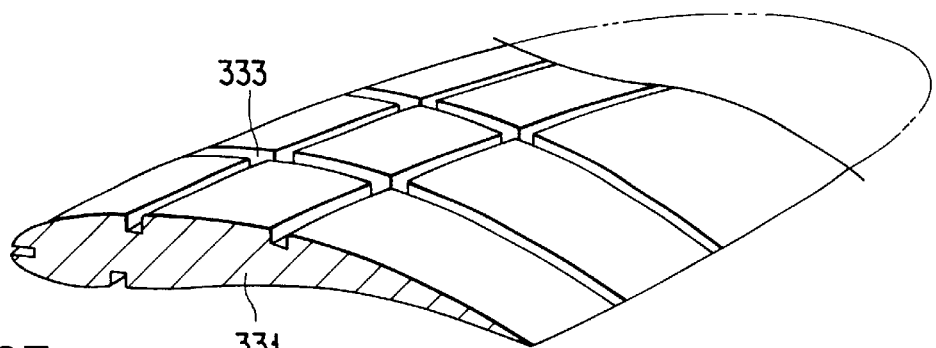
FIG. 27 is a perspective view showing a hollow structure which is manufactured in the twelfth embodiment of the present invention.

A twelfth embodiment for manufacturing a wing of an airplane in the form of a rib structure similar to that according to the foregoing embodiment will now be described with reference to FIGS. 26 and 27.

In this embodiment, a rib structure 330 is formed by using a mandrel 331 formed to correspond to the internal shape of the wing so that the outer shape of the wing is formed. The mandrel 331 has grooves 333 each having a depth corresponding to the shape of the rib 332. The grooves 333 are formed into a lattices shape in the surface of the mandrel 331. Then, a CF cloth prepreg 334 is disposed in the bottom portion of the grooves 333. After the CF cloth prepreg 334 has been disposed, the prepreg 335 is disposed on the bottom surface and in the inside portion of the mandrel 331.

Cores 336 are disposed to correspond to the shapes of the portions covered with the grooves 333. Similarly to the first embodiment, the cores 336 are composed of the cores 336 and prepreg 337 wound around the cores 336. The cores 336 are disposed in the grooves in such a manner that the adjacent cores 336 are disposed closely. Then, the prepreg 338 is laminated from an upper position of the mandrel 331, and then the foregoing elements are heated and hardened. Thus, the outer shape of the wing member can be formed.

After the rib structure 330 has been formed by heating and hardening, holes are formed at arbitrary positions of the prepreg 338 which covers the rib structure 330 or at the lengthwise ends of the mandrel 331. Then, biochemically active substances, such as bacteria and enzymes, are introduced through the holes.

In the wing member formed by the above-mentioned manufacturing method, the mandrel 331 disposed in the wing member and made of the biodegradable polymers is degraded and removed after the wing shape has been formed. Thus, an excellent hollow wing member can be manufactured. Since the mandrel 331 can be degraded and allowed to disappear, a hollow shape can easily be manufactured. Moreover, the weight of the wing member can satisfactorily be reduced.

When fine portions at the end of the wing, that is, portions in which the inside ribs 332 are formed, are first stacked, a shape corresponding to the fine portions can be manufactured. When also the cores 336 are made of the biodegradable polymers, reduction of the weights of the ribs 332 is permitted. As a result, a hollow shape, the weight of which can be reduced, can easily be formed.

Figure 28:
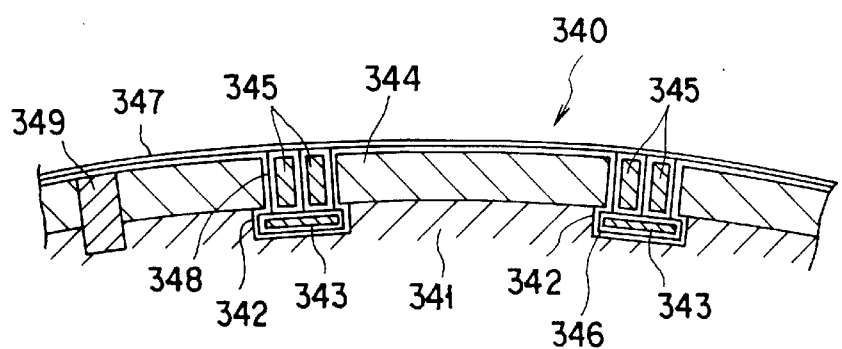
FIG. 28 is a diagram showing a process for manufacturing a rib structure according to a thirteenth embodiment of the present invention.
Figure 29:
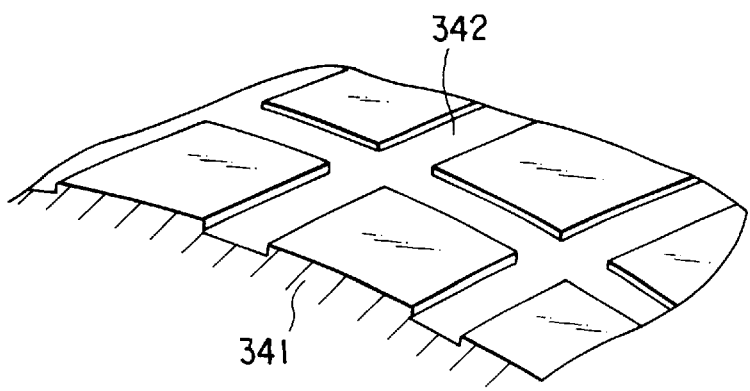
FIG. 29 is a perspective view showing a jig for manufacturing the rib structure according to the thirteenth embodiment of the present invention.
Figure 30:
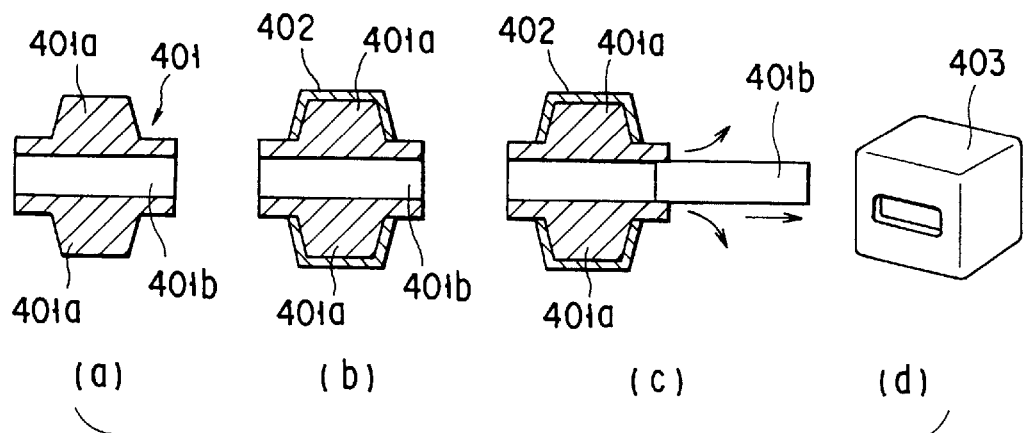
FIG. 30 is a diagram showing a method of manufacturing a conventional hollow structure.
Figure 31:
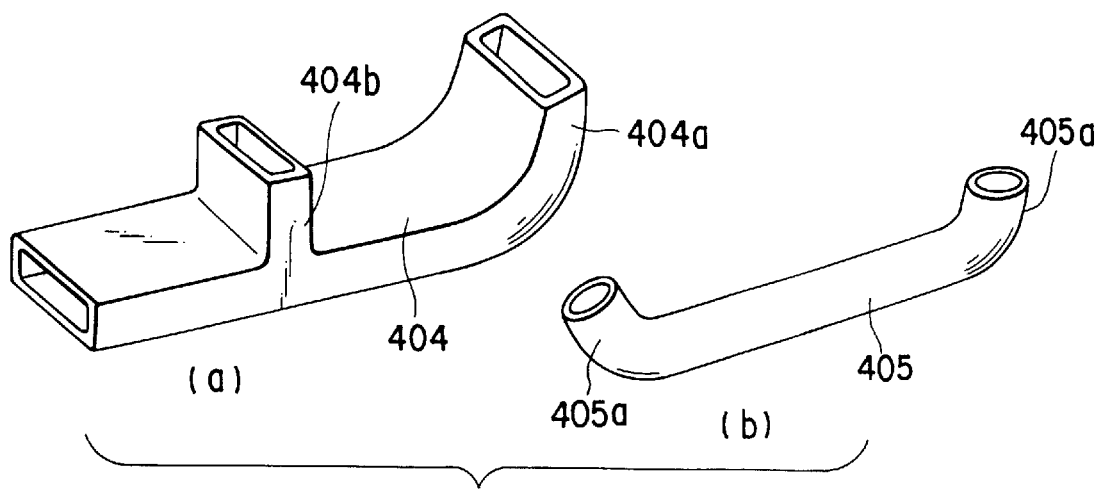
FIG. 31 is a perspective view showing another conventional hollow structure.
Figure 32:
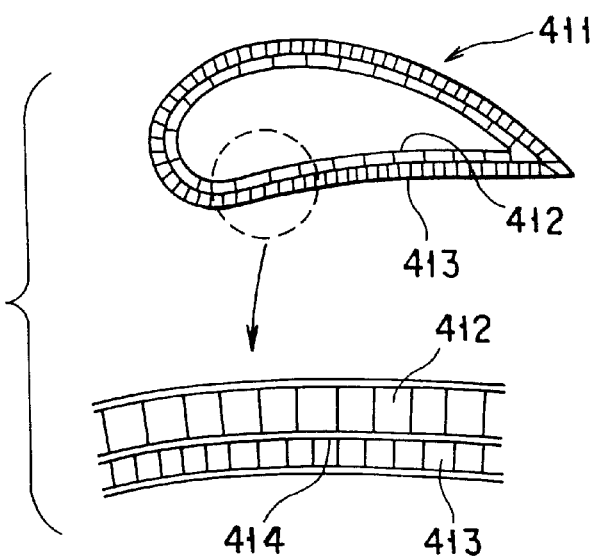
FIG. 32 is a diagram showing a honeycomb core for use to manufacture a conventional honeycomb.
Figure 33:
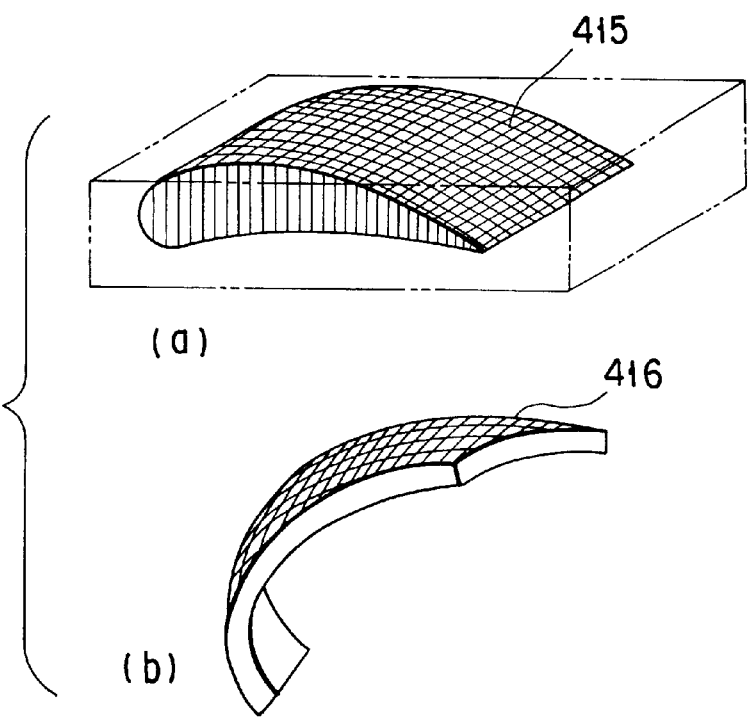
FIG. 33 is a diagram showing a process for manufacturing a conventional hollow structure having three-dimensional curved surfaces.

A thirteenth embodiment for manufacturing a wing of an airplane which is a structure similar to that according to the foregoing embodiment will now be described with reference to FIGS. 28 and 29.

When a rib structure 340 having ribs 346 each having leading formed into an inverted-T-shape is formed, the prepreg cannot easily be laminated as is performed in the second embodiment. In this case, grooves 342 each having a thickness and a width corresponding to the leading ends 343 of the ribs 346 are formed in the surface of the jig 341. Then, CF cloth prepreg 343 serving as the leading end of the rib is disposed in the groove 342.

After the leading ends of the ribs 346 have been disposed in the grooves 342, a plate-like mandrel 344 of biodegradable polymer of a predetermined thickness and a shape (a rectangular shape in this embodiment) corresponding to a space surrounded by the CF cloth prepreg 343 is disposed from an upper position. Since the plate-like mandrel 344 is disposed, the ends of the CF cloth prepreg 343 are secured by the plate-like mandrel 344.

Then, the cores 345 are disposed from an upper position of the CF cloth prepreg 343 such that the core 345 are disposed adjacently. Thus, the inverted-T-shape ribs 346 are provided. Then, the prepreg 347 is disposed from an upper position of the rib 346 to cover the rib 346. Thus, the prepreg 347 and the cores 345 are brought into contact with one another through the plate-like mandrel 344. The cores 345 are made of the biodegradable mandrel similarly to the first and twelfth embodiments. Moreover, a tape-shape prepreg 348 is wound around the core 345.

After the covering prepreg 347 has been disposed, a whole laminate structure including the jig 341 is heated so that the prepreg is melted and hardened. As a result, the outer shape of the wing can be formed. The position of the plate-like mandrel 344 is fixed by a locating pin 349 to locate the position with respect to the jig 341.

Since the method of manufacturing the rib structure 340 having the above-mentioned structure is formed as described above, the grooves 342 are previously formed in the jig 341. When the grooves 342 are used, the rib structure 340 integrally having the ribs 346 formed into the inverted-T-shape can easily be formed. Since the integral forming process is employed, the strength of the rib structure 340 can be raised.

After the formed rib structure 340 has been detached from the jig 341, as in the above-mentioned embodiment, the mandrel 344, core material, etc., are removed through a breakdown by a bioactive material such as bacteria and enzyme and it is possible to obtained a compact, high-rigid rib structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a structure made of fiber-reinforced composite material by using a mold made of a biodegradable material, comprising:

a step for forming said mold by using a material containing biodegradable polymers;

a step for laminating said fiber-reinforced composite material on said mold;

a step for hardening said fiber-reinforced composite material;

a step for removing said mold by dint of biochemical degradation;

said step for forming said mold by using said material containing said biodegradable polymers is to form a multiplicity of spherical cores;

said step for laminating said fiber-reinforced composite material on said mold includes a step for forming reinforcing-fiber spherical members by laminating reinforcing fibers and non-hardened resin on the outer surfaces of said spherical cores; and a step for filling a multiplicity of said reinforcing-fiber spherical members into another mold so as to bring said reinforcing-fiber spherical members into close contact with one another.

2. A method of manufacturing a structure made of fiber-reinforced composite material by using a mold made of biodegradable material, comprising:

a step for forming said mold by using a material containing biodegradable polymers;

a step for laminating said fiber-reinforced composite material on said mold;

a step for hardening said fiber-reinforced composite material;

a step for removing said mold by dint of biochemical degradation;

said step for forming said mold by using said material containing said biodegradable polymers is to form a multiplicity of expandable and spherical cores;

said step for laminating said fiber-reinforced composite material on said mold includes a step for forming reinforcing-fiber spherical members by laminating reinforcing fibers and non-hardened resin on the outer surfaces of said spherical cores;

a step for filling a multiplicity of said reinforcing-fiber spherical members into another mold so as to bring said reinforcing-fiber spherical members into close contact with one another; and said step for hardening said fiber-reinforced composite material is to expand said expandable and spherical cores by heating said reinforcing-fiber spherical members filled in said another mold so as to bring said laminated reinforcing fibers and said non-hardened resin into close contact with one another and harden said non-hardened resin.

* * * * *